US 7,487,040 B2

(12) United States Patent
Catalinotto

(10) Patent No.: US 7,487,040 B2
(45) Date of Patent: Feb. 3, 2009

(54) SYSTEM AND METHOD FOR ESTABLISHING A LOCAL PAGE AND GRID NUMBERING SYSTEM IN A GEOGRAPHIC REFERENCING SYSTEM

(76) Inventor: Bernard Catalinotto, 6001 Henning St., Bethesda, MD (US) 20817

( * ) Notice: Subject to any disclaimer, the term of this patent is extended or adjusted under 35 U.S.C. 154(b) by 900 days.

(21) Appl. No.: 10/983,565

(22) Filed: Nov. 8, 2004

(65) Prior Publication Data

US 2005/0107948 A1  May 19, 2005

Related U.S. Application Data

(60) Provisional application No. 60/519,640, filed on Nov. 14, 2003.

(51) Int. Cl.
G01C 21/32 (2006.01)
G06F 17/16 (2006.01)
G01C 21/30 (2006.01)
G01C 21/00 (2006.01)

(52) U.S. Cl. ........................ 701/208; 701/200
(58) Field of Classification Search .......... 701/200, 701/208; 340/995.1, 995.14, 995.15; 707/100, 707/102, 205
See application file for complete search history.

(56) References Cited

U.S. PATENT DOCUMENTS

| | | | |
|---|---|---|---|
| 4,521,998 A | 6/1985 | DeLorme | |
| 4,972,319 A | 11/1990 | DeLorme | |
| 5,030,117 A | 7/1991 | DeLorme | |
| 5,422,814 A | 6/1995 | Sprague et al. | |
| 5,559,707 A | 9/1996 | DeLorme et al. | |
| 5,802,492 A | 9/1998 | DeLorme et al. | |
| 5,839,088 A | 11/1998 | Hancock et al. | |
| 5,848,373 A | 12/1998 | DeLorme et al. | |
| 5,948,040 A | 9/1999 | DeLorme et al. | |
| 6,047,236 A | 4/2000 | Hancock et al. | |
| 6,202,023 B1 | 3/2001 | Hancock et al. | |
| 6,223,122 B1 | 4/2001 | Hancock et al. | |
| 6,295,502 B1 | 9/2001 | Hancock et al. | |
| 6,321,158 B1 | 11/2001 | DeLorme et al. | |
| 6,339,744 B1 | 1/2002 | Hancock et al. | |

(Continued)

OTHER PUBLICATIONS

B. Catalinotto, "Universal Map Referencing System: Case Study of a Commercial National Coordinate System" paper, 1992, Trimble Atlas, copyright Thomas Bros Maps.

(Continued)

Primary Examiner—Thomas G Black
Assistant Examiner—Christine M Behncke
(74) Attorney, Agent, or Firm—Roberts Mardula & Wertheim, LLC

(57) ABSTRACT

A system and method for establishing a local page and grid numbering system (LPGNS) in a geographic referencing system. A universal page number array is defined for the geographic referencing system. Each element of the universal page number array represents a "universal" page and is assigned a universal page number. A local defining area is selected and an alignment point defined using a deterministic method. A local page block array comprising local pages for a local defining area is defined. A keystone page within the local page block array is defined and aligned with the universal page number containing the alignment point. Local page numbers are assigned to the universal page numbers relative to the keystone page

13 Claims, 22 Drawing Sheets

U.S. PATENT DOCUMENTS

| | | | |
|---|---|---|---|
| 6,356,834 | B2 | 3/2002 | Hancock et al. |
| 6,442,483 | B1 * | 8/2002 | Doglione .................... 701/300 |
| 6,473,692 | B2 * | 10/2002 | Hancock et al. ............. 701/208 |
| 6,597,983 | B2 | 7/2003 | Hancock et al. |
| 6,609,062 | B2 | 8/2003 | Hancock et al. |
| 2002/0002439 | A1 | 1/2002 | Agnew et al. |
| 2003/0182052 | A1 | 9/2003 | DeLorme et al. |

OTHER PUBLICATIONS

The National Area Coding System, 2005, NAC Geographic Products, Inc., website of NAC Graphics, Toronto Canada, <http://www.nacgeo.com/nacsite/documents/nac.asp>.

US National Grid standard, prepared by FGDC, 2001 [document FGDC-STD-011-2001].: <http://www.fgdc.gov/standards/documents/standards/xy_proj/fgdc_std_011_2001_usng.pdf>.

* cited by examiner

Figure 1 is a map of the continental USA with the UTM zones and USNG gridzones overlaid.

UTM zones are integers (17 or 18); USNG zones are integers plus letters (17R or 18S)

PRIOR ART

Figure 4A is a map of a sample study area -- central FL -- with an array of 50x50 map page boundaries indicated.
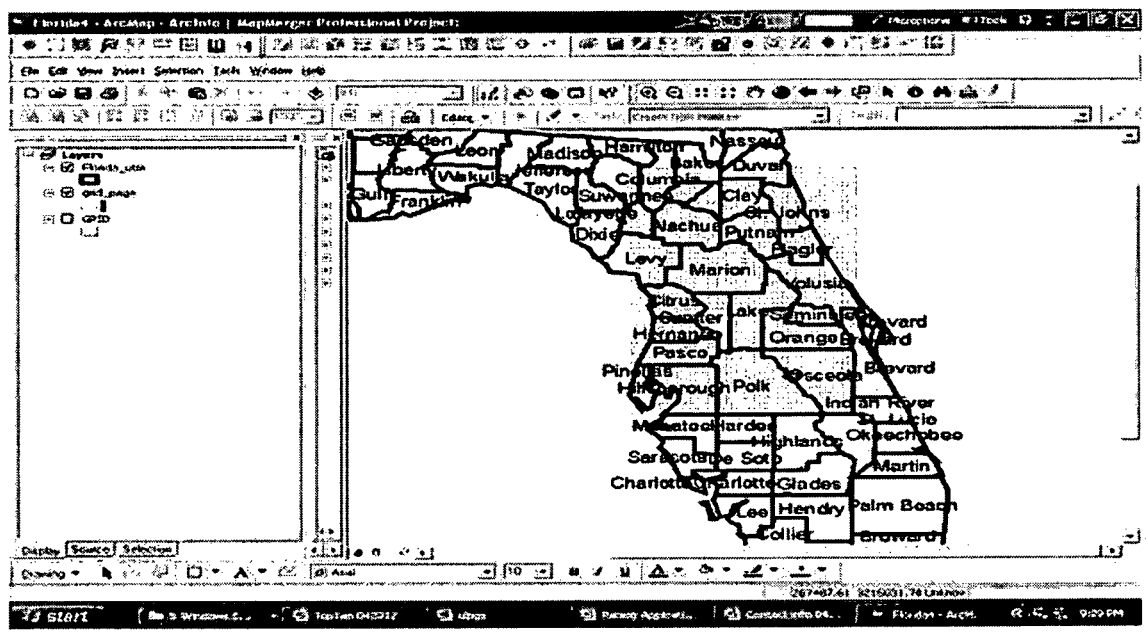

Figure 4B is a map of a portion of the study area – Tampa Bay metro area FL – with the page boundaries indicated
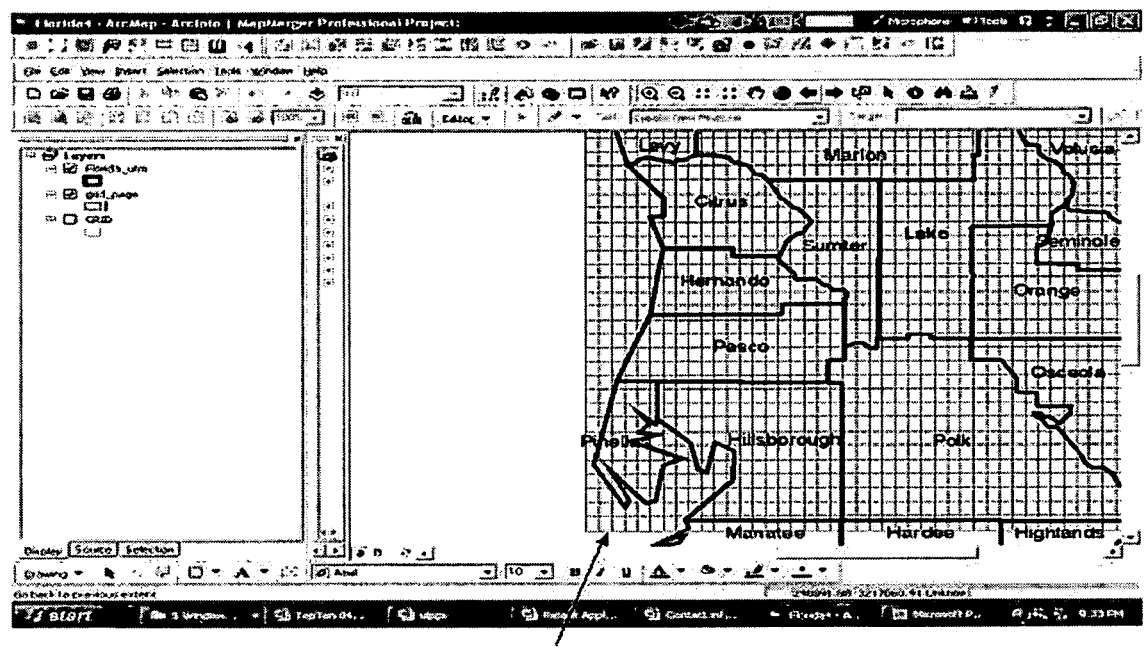
Citrus, Hernando, Pasco, Pinellas, Hillsborough Figure 4C is a map of a portion of the study area – Citrus County, FL – with the page boundaries and the universal page numbers indicated
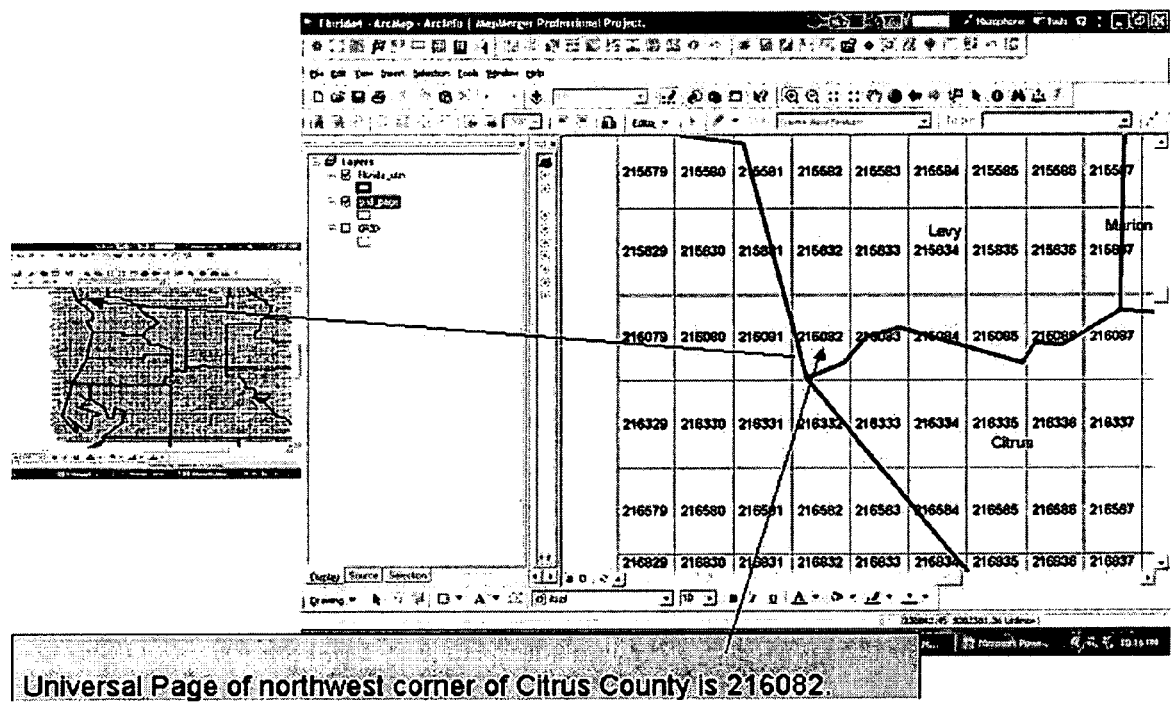

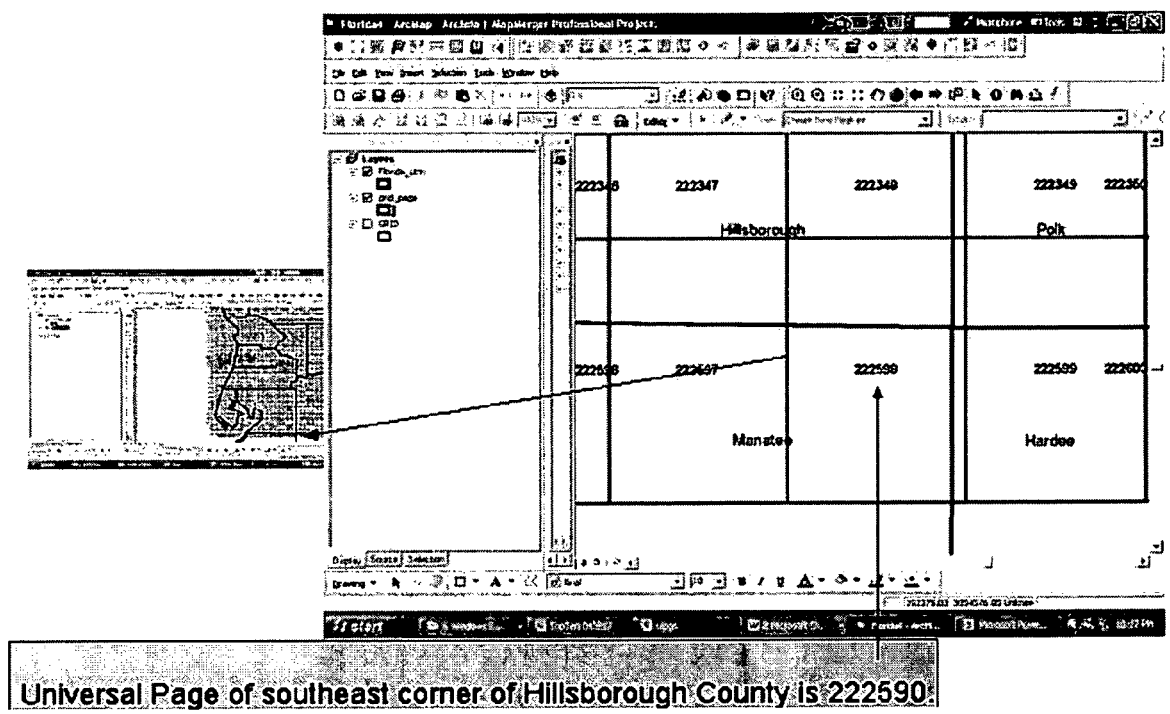
Figure 5 is a map of a portion of the study area — Hillsborough County, FL — with the page boundaries and the universal page numbers indicated Figure 6 is a map of a portion of the study area — Citrus and Hernando FL — with Citrus County-based local page numbers indicated
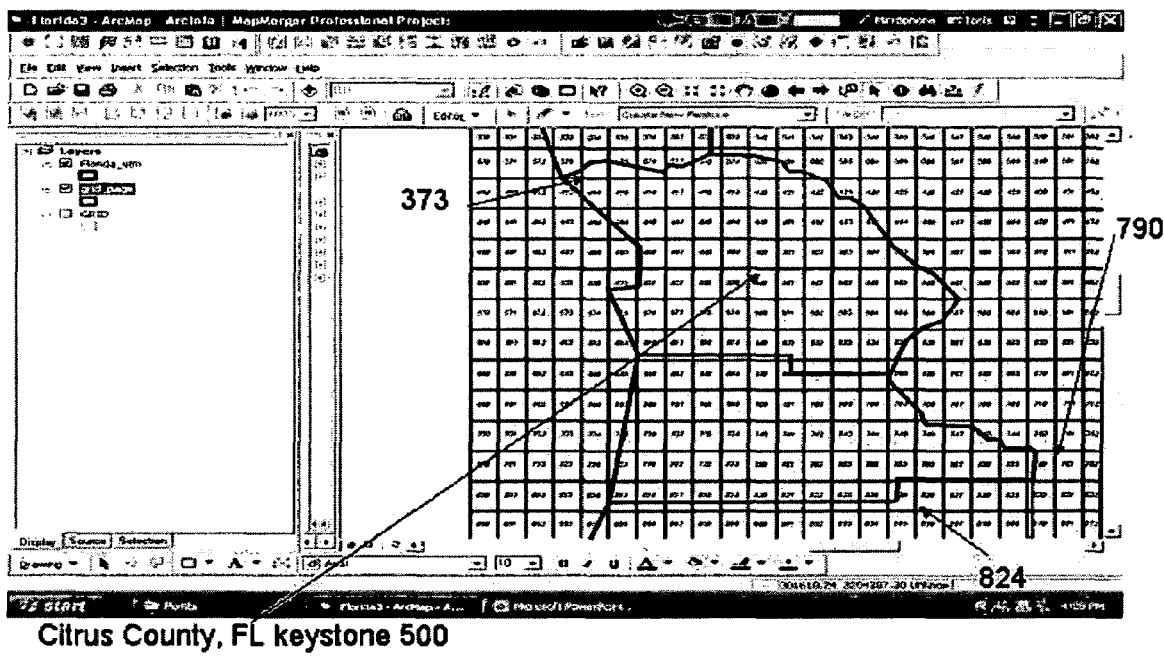
Citrus County, FL keystone 500

Figure 7 is a map of a portion of the study area – Citrus FL – with Citrus County-based local page numbers indicated
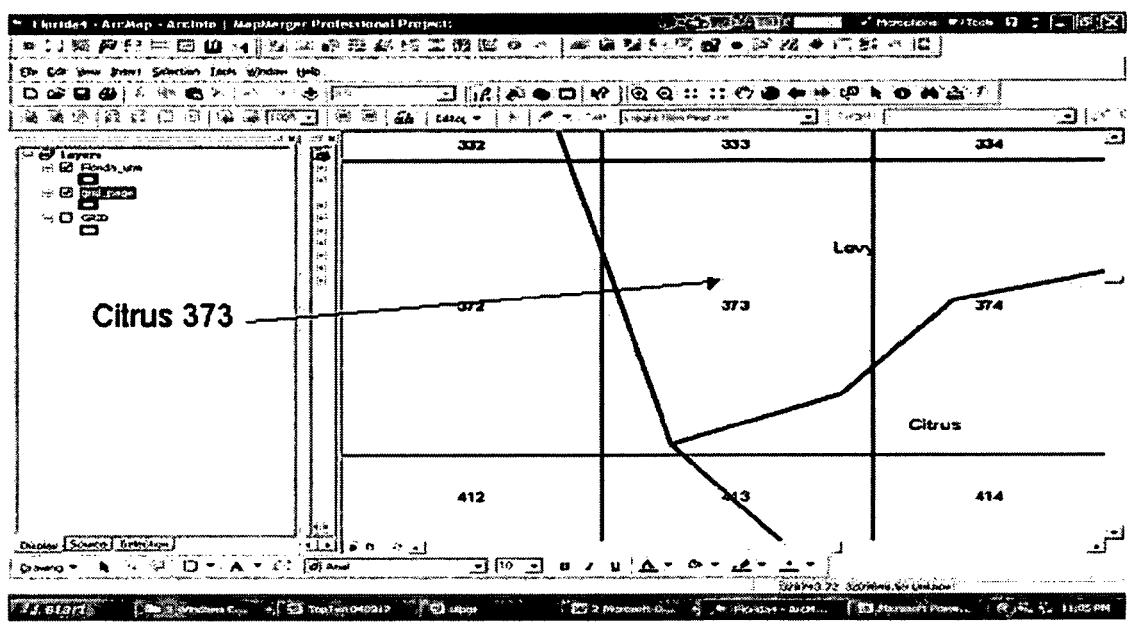

Figure 8 is a map of a portion of the study area — Citrus FL — with Citrus County-based local page numbers indicated, indicating keystone page 500
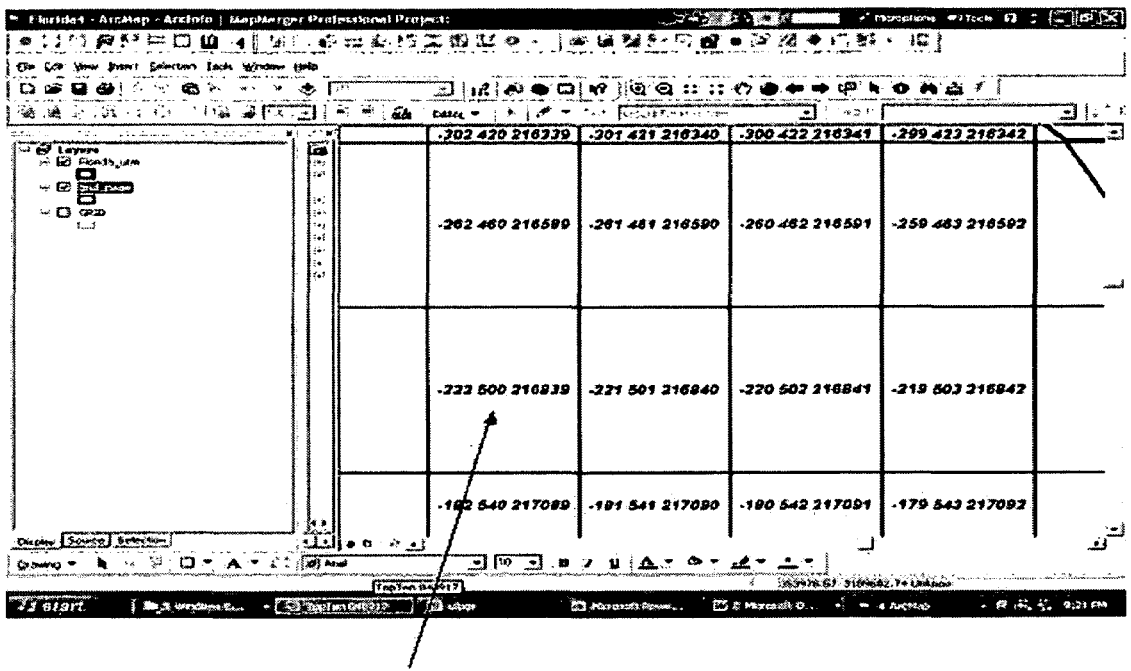
Universal 216839 = Citrus 500

Figure 9 is a map of a portion of the study area – Hernando FL – with Citrus County-based local page numbers indicated
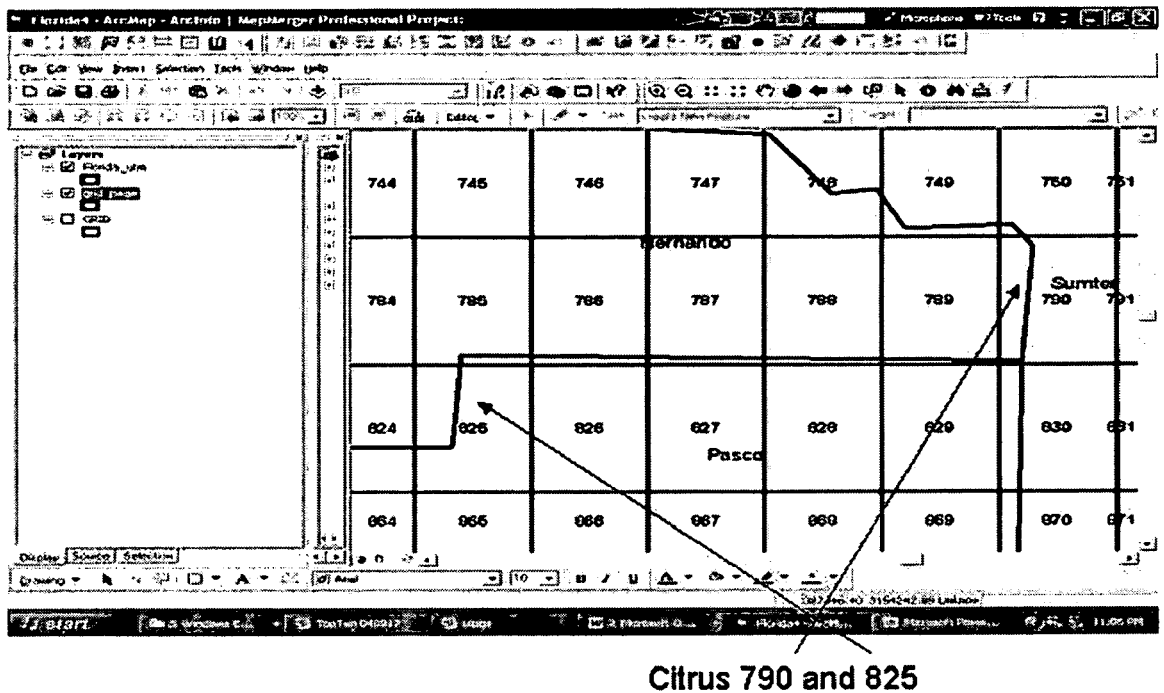
Citrus 790 and 825

Figure 10 is a map of a portion of the study area — Pasco, Pinellas and Hillsborough FL — with Hillsborough County-based local page numbers indicated
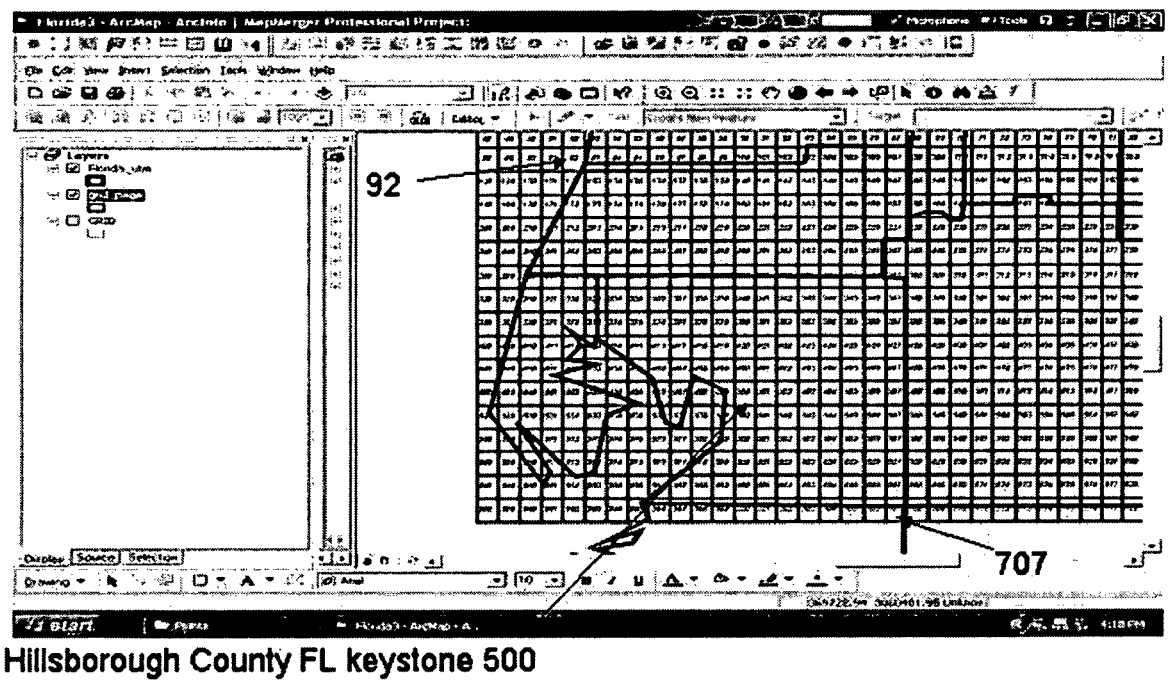
Hillsborough County FL keystone 500

Figure 11 is a map of a portion of the study area – Pasco FL – with Hillsborough County-based local page numbers indicated covers northwest corner of Pasco – first page in three county street atlas
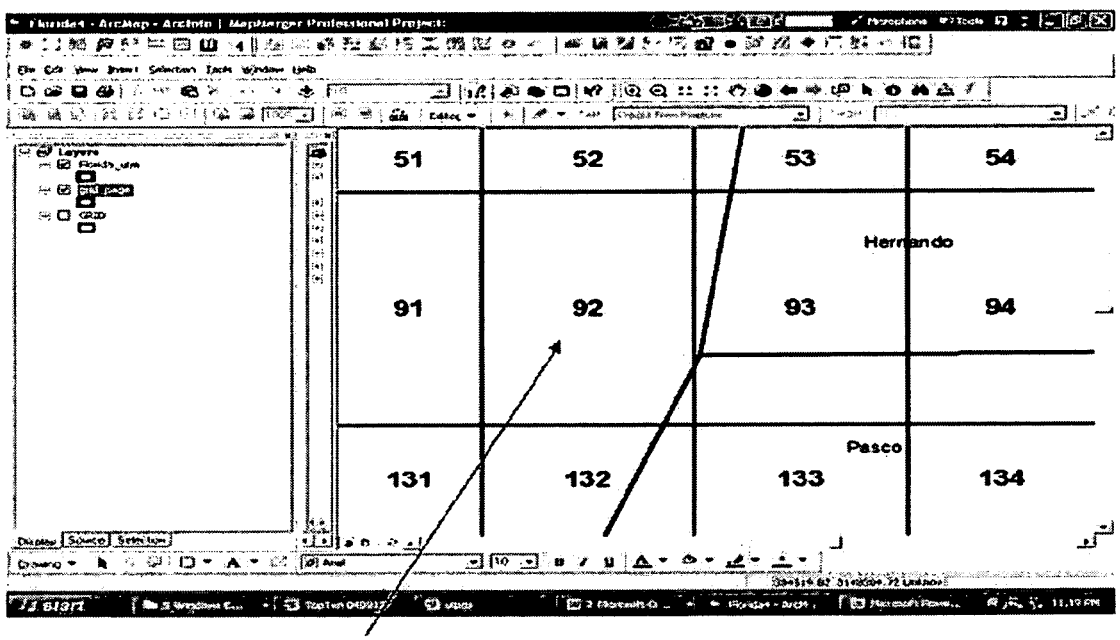
Hillsborough Page 92

Figure 12 is a map of a portion of the study area – Hillsborough FL – with Hillsborough County-based local page numbers indicated, indicating keystone page 500
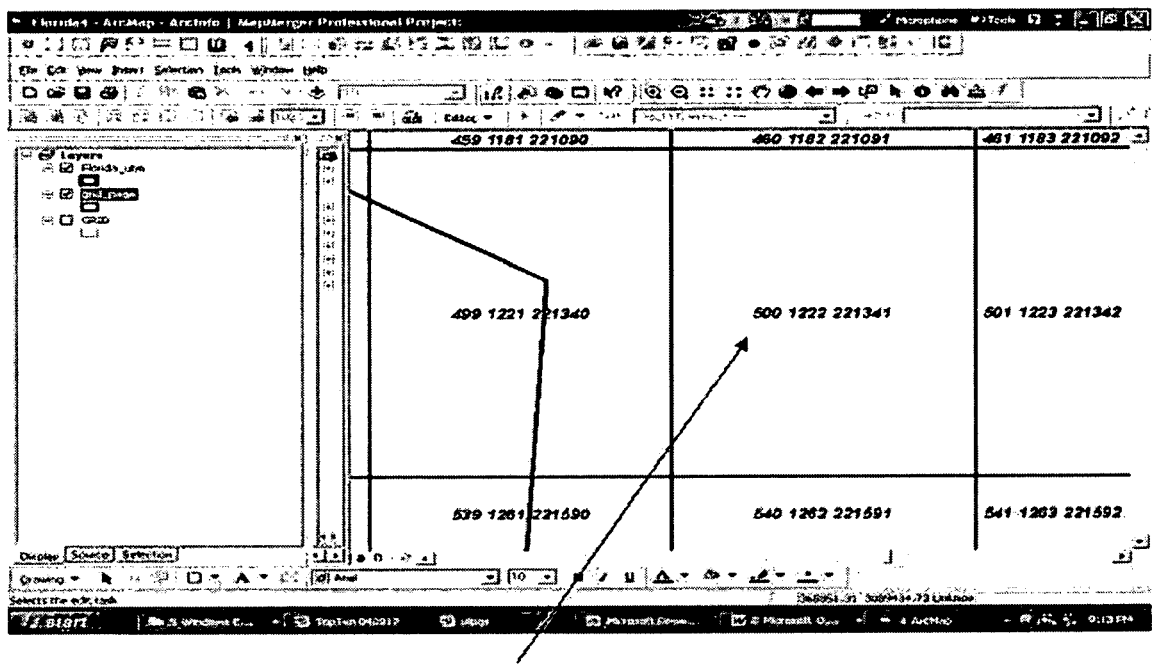
Hillsborough 500 = Universal 221341

Figure 13 is a map of a portion of the study area – Hillsborough FL – with Hillsborough County-based local page numbers indicated
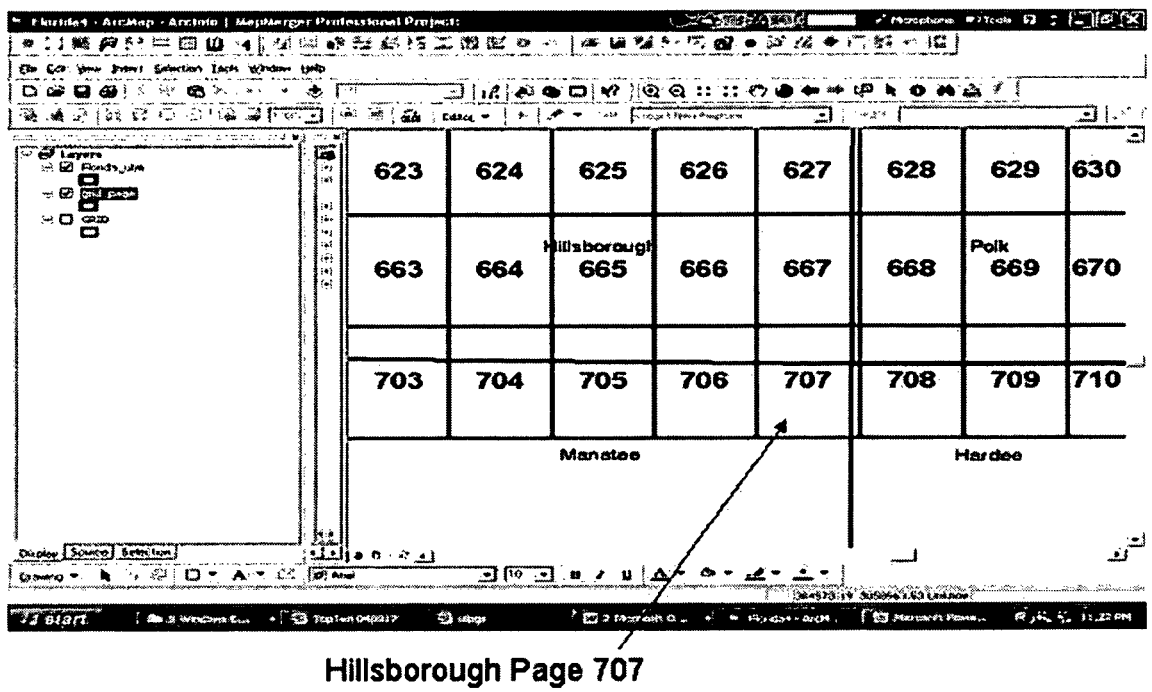
Hillsborough Page 707

Figure 14 is a map of a portion of the study area – Hernando and Pasco FL – with Citrus and Hillsborough County-based local page numbers indicated
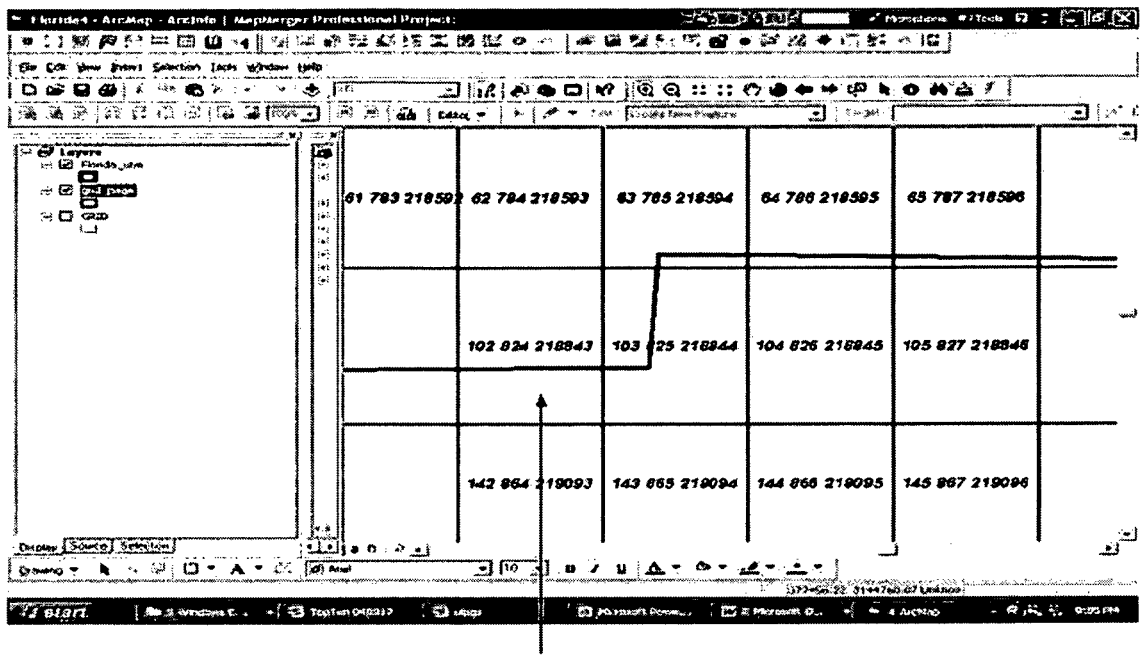
Univ 218843 = Citrus 824 = Hillsborough 102

Figure 15 is a map of a portion of the study area – Hernando and Pasco FL – with Citrus and Hillsborough County-based local page numbers indicated
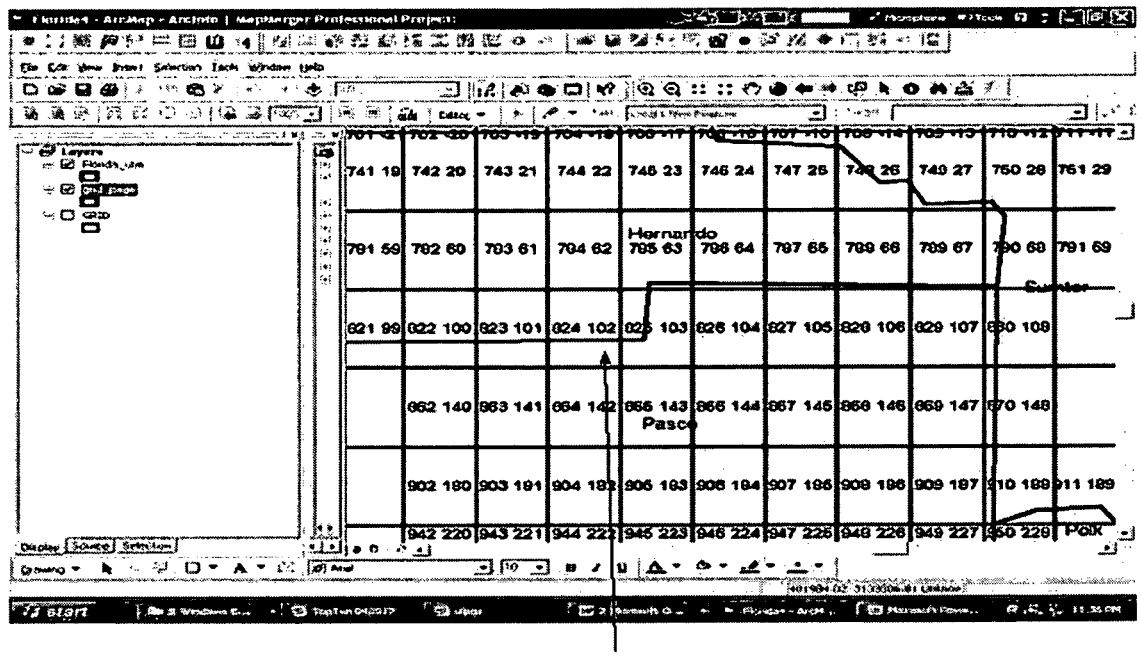
Univ 218843 = Citrus 824 = Hillsborough 102

Figure 16 is a map of a portion of the study area – Citrus, Hernando and part of Pasco FL – with Pasco County-based local page numbers – based on non-default page width of 30 pages – indicated
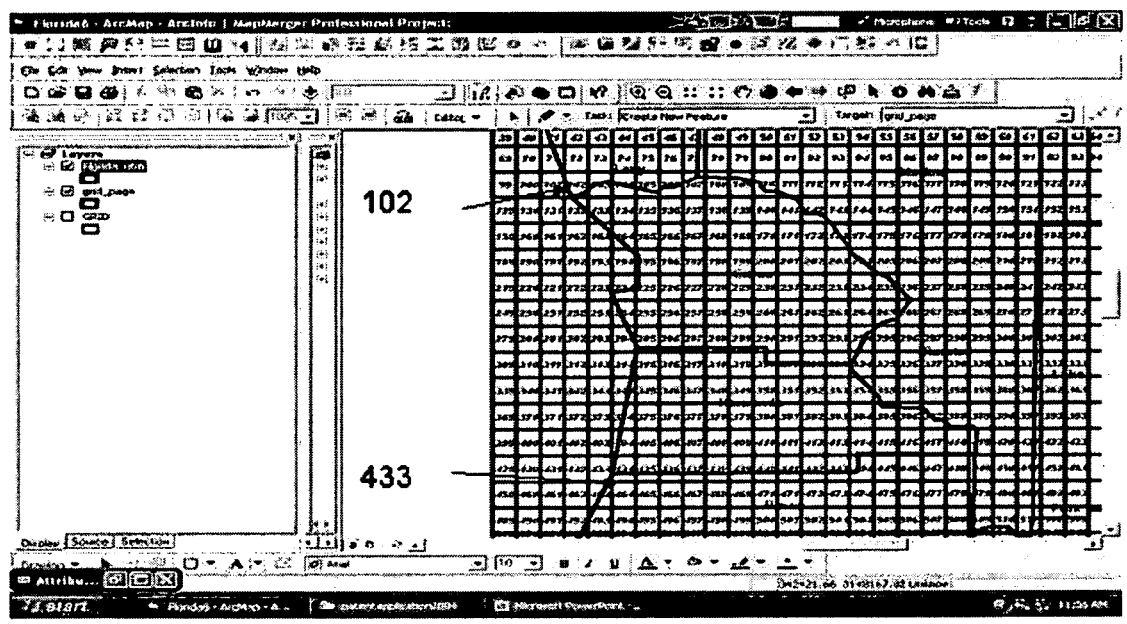

Figure 17 is a map of a portion of the study area — Pasco Pinellas and Hillsborough FL — with Pasco County-based local page numbers — based on non-default page width of 30 pages — indicated
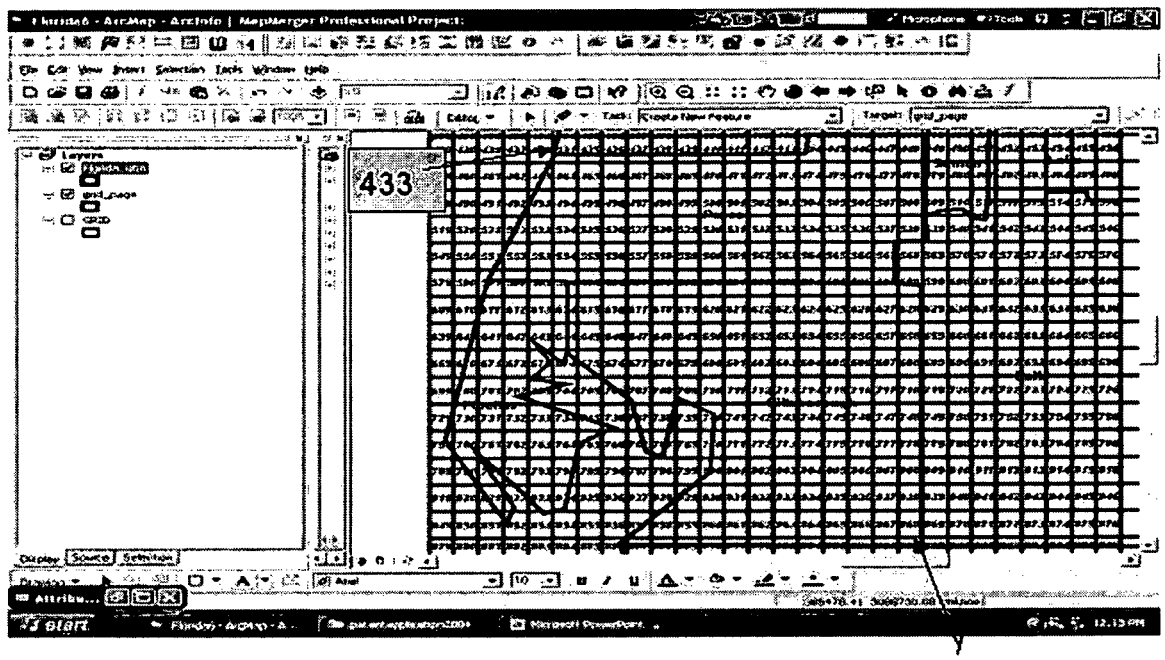
869

Figure 18 illustrates the universal and local page numbers and coordinates of the Hillsborough,, Florida (12057) Keystone Page
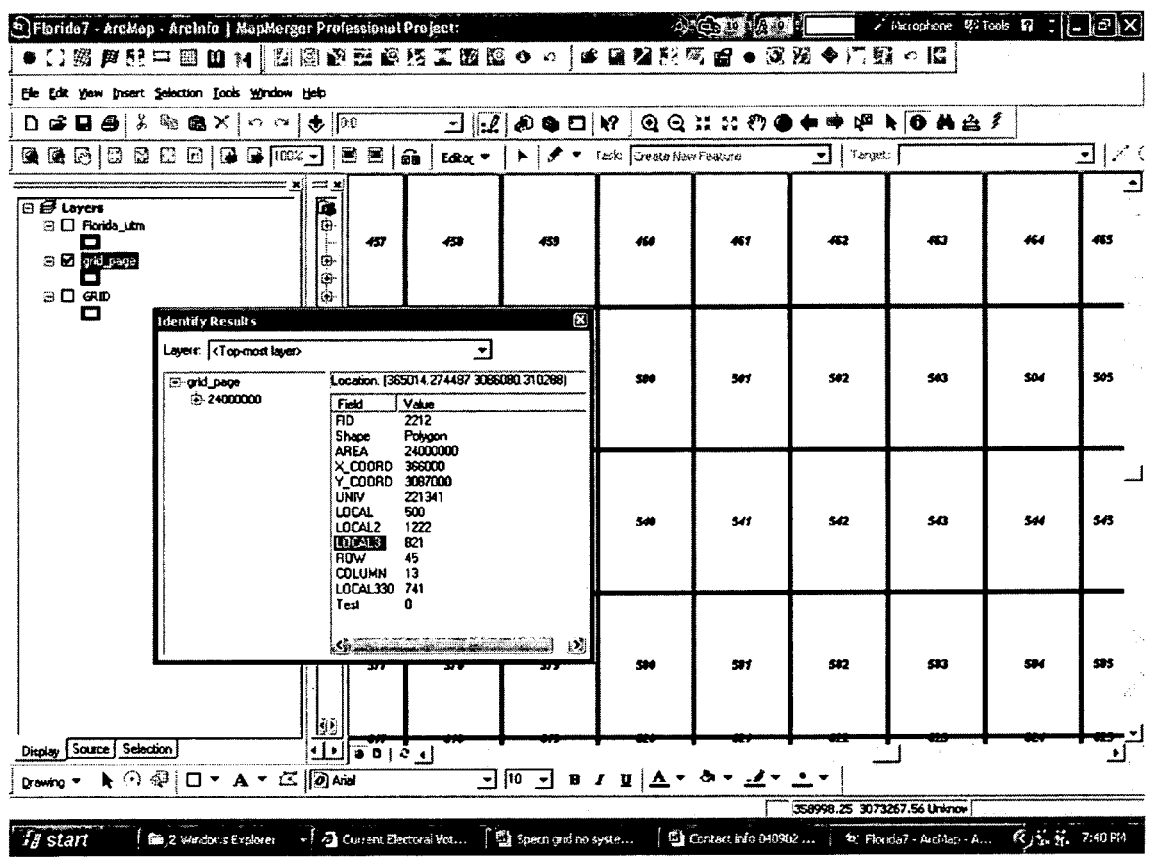

Figure 19 illustrates the universal and local page numbers and coordinates of Hillsborough, Florida (12057) Local Page 622
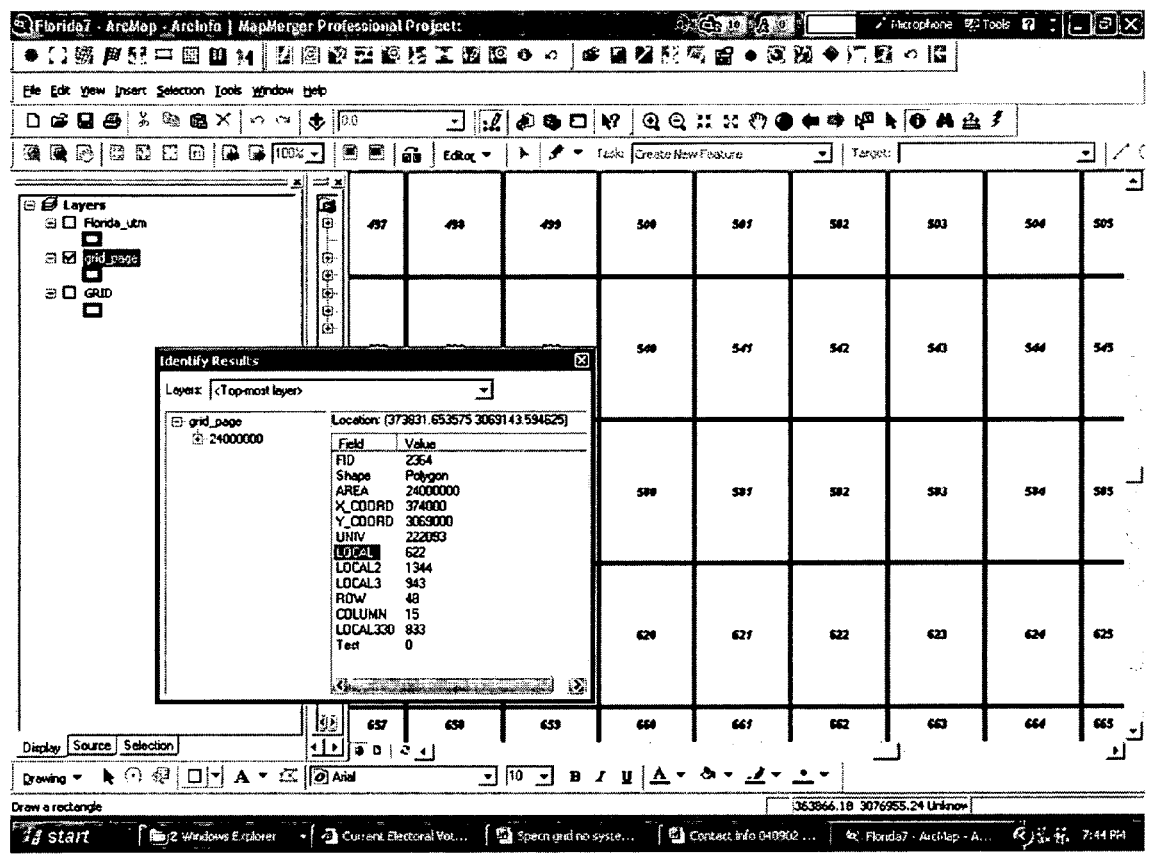

US 7,487,040 B2

SYSTEM AND METHOD FOR ESTABLISHING A LOCAL PAGE AND GRID NUMBERING SYSTEM IN A GEOGRAPHIC REFERENCING SYSTEM

CROSS REFERENCE TO RELATED APPLICATIONS

This application claims priority under 35 U.S.C. §119(e) from provisional application No. 60/519,640 filed Nov. 14, 2003. The Ser. No. 60/519,640 provisional application is incorporated by reference herein, in its entirety, for all purposes.

BACKGROUND

Embodiments of this invention relate to geography, geographic information systems and digital cartography. More particularly embodiments of this invention relate to a system and method for establishing a map page layout over an area together with a local/universal page and grid numbering system in a geographic referencing system and linking global positioning system (GPS)—defined locations directly to the page and grid of a map atlas or other publication.

Every location in the U.S. is served by public and private map publications that have no relationship to locational coordinates provided by GPS units. Some publications include tick marks for lat/long, Universal Transverse Mercator (UTM), state plane, Township-and-Range (TSR), and other geographic reference systems at the edge of or within their maps, but there is no logical connection to the page number in the map publication. The source of this problem is that there is no algorithmic method of generating, from a projection's coordinates, a local page and grid numbering system to be used in local street atlases, parcel maps and other mapping products.

The geographic referencing systems in digital maps and GPS units are almost always completely different from the geographic referencing systems in those map publications that are in book form. There is no easy or standard way to translate the computerized map coordinates to the pages of the map publications.

By way of illustration, the U.S. Geological Survey (USGS) publishes large-scale (1:24000) maps of the U.S. (referred to as "QuadSheets") for using geographic coordinates ("latitude/longitude") as the basis for mapsheet tiling. Commercial atlas publishers such as DeLorme have published QuadSheets as map pages. However, the USGS product has no associated page and grid system, and the commercial product page and grid arrangement is not algorithmically derived.

The UTM projection is an excellent referencing system that is useful as a grid reference and is featured in many commonly available GPS units. In the UTM grid, the world is divided into 60 north-south zones, each covering a strip 6° wide in longitude. These zones are numbered consecutively beginning with Zone 1, between 180° and 174° west longitude, and progressing eastward to Zone 60, between 174° and 180° east longitude. Thus, the conterminous 48 States are covered by 10 zones, from Zone 10 on the west coast through Zone 19 in New England. In each zone, coordinates are measured north and east in meters. The northing values are measured continuously from zero at the Equator, in a northerly direction. To avoid negative numbers for locations south of the Equator, NIMA's cartographers assigned the Equator an arbitrary false northing value of 10,000,000 meters. A central meridian through the middle of each 6° zone is assigned an easting value of 500,000 meters. Grid values to the west of this central meridian are less than 500,000; to the east, more than 500,000.

The United States National Grid (USNG) is an alphanumeric point reference system that overlays the UTM numerical coordinate system. The USNG provides a system for identifying locations and for specifying one-kilometer square grids. For example, the Washington Monument is located in the middle of column 23 and row 06 which is Grid 2306 of its local 100,000-square meter zone. Map publishers can publish wall maps and folding maps that use the USNG two-digit grid designations to indicate column and row and can create indexes of street names and points of interest that provide the four digit grid (two digits column and two digits row) as a reference. Map publishers can also use these grid designations on map pages in street atlases.

While useful, the UTM and USNG are not designed for the page and grid numbering of map publications. The United Kingdom and several other foreign countries have a referencing system similar to the U.S. National Grid, but they, too, are not designed for the page and grid numbering of map publications. Further, there is no standard method of relating USNG grids to the pages of the local street atlas, and there is no system that converts the USNG grids to the page number (or page and local grid) of the page that contains that grid.

As the U.S. National Grid comes into common usage as a geographic reference system, there will be a growing need for a geographical reference system that translates a USNG designation to a local page and grid designation in atlases that display the USNG. For example, assume the Washington Monument is on page 500 of an atlas. If a user of a street atlas wishes to find the location of Grid 2306 on a page of a mapbook, the user needs to consult a table of grid values that points the user to the page number of the page in the atlas. A lookup table which matches 2306 with 500 would be required. In fact, a page in an atlas will include many one-kilometer grids. A standard page will contain 24 grids, four grids wide by six grids tall. The lookup table would be required to point the user to the page and the (local) grid of the atlas. For example, if USNG grid 2306 were to equal Local Page 500 Grid A3, then the grid to the south, USNG Grid 2305 would equal Local Page 500 Grid A4, as shown in the following illustrative table:

| USNG Grid | LPGNS Page | LPGNS Grid |
| --- | --- | --- |
| 2300 | 540 | A3 |
| 2301 | 540 | A2 |
| 2302 | 540 | A1 |
| 2303 | 500 | A6 |
| 2304 | 500 | A5 |
| 2305 | 500 | A4 |
| 2306 | 500 | A3 |
| 2307 | 500 | A2 |
| 2308 | 500 | A1 |
| 2309 | 460 | A6, |
| etc. | ... | ... |

Rand McNally uses a proprietary Lambert Conformal Conic projection and local page and grid referencing system that has a relationship to the map projection that allows it to be rendered in a GPS unit. However, the local system covers less than ten percent of the land area of the U.S. Further, the local grids were assigned in a non-algorithmic manner, so there is no algorithmic relationship to the local area covered.

U.S. Pat. No. 5,839,088, issued to Hancock and entitled, "Geographic Location Referencing System And Method,"

describes a system and method for creating and using a location referencing address method associated with an established geographic information system. The location referencing address method has an arbitrary local referencing system that retains a known relationship with a global referencing system. While Hancock identifies locations in relationship to the position of local features, its utility is identification and transmission of locational coordinates, not map publishing. Further, Hancock does not provide a page and grid numbering system.

U.S. Pat. No. 5,848,373, issued to DeLorme et al. and entitled, "Computer Aided Map Location System," describes a system for correlation and coordination of spatially related information between diverse media such as transitory digital electronic displays or other computer outputs and graphics, text, fixed media presentations such as printed sheet media including printed maps. However, DeLorme et al. does not address the issue of page and grid numbering.

What would be useful would be a system and method to convert the coordinates of a common projection (such as UTM) to a local page and grid numbering system. Such a system and method would employ an algorithm to create the page and grid layout of local map products.

SUMMARY

In an embodiment of the present invention, an algorithm converts the coordinates of a common projection (such as UTM) to a unique page within a Local Page and Grid Numbering System (LPGNS). The unique pages are assigned "universal" page numbers. Local defining areas (for example and without limitation, counties in the U.S.) are selected. A deterministic method of defining an "alignment point" within the local defining area is applied. A local page block array comprising the local pages for a local defining area is defined. A keystone page within the local page block array is defined and aligned with the universal page number containing the alignment point. Local page numbers are assigned to the universal page numbers relative to the keystone page number.

In an embodiment of the present invention, the algorithm resides in a GPS unit and converts the projection coordinates to the local page and grid reference. However, this is not meant as a limitation. The algorithm may be applied to the projection coordinates in a computing device separate from the GPS unit. By way of illustration and not as a limitation, emergency responders may use embodiments of the present invention to use GPS coordinates together with published map atlases and computer maps to respond to emergencies, with a large measure of redundancy that is so valuable in times of emergency.

In an exemplary embodiment of the present invention, LPGNS pages are generated from the grids of the UTM projection. Two types of page numbers are generated: (1) universal pages that are unique and cover an entire zone; and (2) local pages which cover only a small, local portion of the zone. A unique "universal" LPGNS page number is assigned to each page in each UTM zone. One or more local page numbers are assigned to each LPGNS page so as to link the numbering system to the local geography. In an embodiment of the present invention, this link is established by identifying a fixed point (the alignment point described above) representing the approximate geometric center (the "centroid") of a bounding box that encloses a local area (for example, a county or other civil division) to be tiled into pages. The LPGNS page that includes the centroid is assigned a common, constant local page number. In an embodiment of the present invention, the "keystone" page—which in this embodiment is also called the "centroid" page—is located at the center of the page block and is assigned a constant number relative to the page block. In an exemplary embodiment, the page block is forty (40) "universal" pages wide and twenty-five (25) "universal" pages in height, and the keystone page is assigned local page number 500. However, this is not meant as a limitation. Other page blocks dimensions may be used and other keystone pages may be assigned without departing from the scope of the present invention. In the exemplary embodiment, the 1000 local pages in the page block that surrounds the centroid (or "keystone") page are identified by their offset from the keystone page, thereby linking the numbering system to the local geography.

In yet another embodiment of the present invention, the alignment point comprises the centroid of the local defining area and the keystone page is determined by finding the universal page in which the centroid of the local defining area is located.

It is therefore an aspect of the present invention to automate the process of laying out the local page and grid numbering system of map atlases in a way that enhances the utility of such maps.

It is another aspect of the present invention to be able to identify a LPGNS local page and grid number of a point of interest based on knowledge of UTM or other mapping systems.

It is a further aspect of the present invention to calculate from the coordinates of a point of interest a LPGNS local page and grid number in a local map atlas created using the LPGNS.

It is yet another aspect of the present invention to enable users of GPS units and map atlases to see the map atlas page and grid of a location set forth directly in the GPS unit.

These and other objectives of the present invention will become apparent to those skilled in the art from a review of the summary and detailed description of the invention that follows.

Embodiments of the present invention allow for the automated definition of page dimensions for map sheets that cover a geographic area. In an exemplary embodiment, local defining areas (for example and without limitation, counties in U.S.) are selected. A bounding box and centroid for each defining area is then calculated. A keystone page for each centroid is identified and local page numbers for each defining area are assigned. This algorithmic approach helps define page extents and assigns LPGNS page numbers to every page algorithmically.

Using the approach of the present invention provides:

Automatic generation of LPGNS "universal" pages

Automatic generation of LPGNS "local" pages based on local geography

Automatic lookup of LPGNS "universal" and "local" page and grid from UTM coordinates This process results in a unique method of enhancing U.S. National Grid to work with GPS as well as a unique algorithm to translate UTM coordinates to universal and local page and grid references.

An embodiment of the present invention provides a method for assigning local page numbers to a geographic region within a geographic referencing system. In an embodiment of the present invention, the geographic referencing system is selected from the group consisting of Universal Transverse Mercator, a state plane, or a Township-and-Range. According to this method, a universal page number array comprising universal array elements is defined. In an embodiment of the present invention, defining a universal page number array comprises defining a universal page dimension in terms of a width and height. The number of universal page number array columns is determined by dividing a vertical extent of the geographic region by the universal page width. The number of universal page number array rows is determined by dividing the horizontal extent of the geographic region by the universal page height.

The universal page number array is overlaid on the geographic region and a universal page number assigned to each universal array element. In an embodiment of the present invention, the universal array is overlaid on the geographic region by determining a meridian of the geographic region, and aligning a column boundary between universal array elements with the meridian. In another embodiment of the present invention, assigning the universal page number to each universal array element comprises numbering the universal array elements consecutively beginning with array element [1,1].

A local defining area is defined and an alignment point of the local defining area determined. In an embodiment of the present invention, a local defining area is selected from the group consisting of a county, a city, a region, a civil division, and a governing district. In another embodiment of the present invention, the alignment point of the local defining area is determined by defining a bounding box comprising a rectangle situated horizontally and containing the local defining area. In this embodiment, the bounding box is of a size sufficient to circumscribe the local defining area. The center of the bounding box is then determined. In yet another embodiment of the present invention, the alignment point of the local defining area is determined by determining the center of gravity of a polygon defined by the local defining area.

A local page block array of universal elements is defined. The local page block array comprises local page block array elements. A local keystone page number is assigned to the universal array element in which the alignment point is located. The keystone page within the local page block array is located. The keystone page within the local page block array is aligned with the universal array element in which the alignment point is located. A local page number is assigned to each local page block array element relative to the local keystone page, thereby facilitating publication of a map of the local defining area comprising local page numbers associated with the geographic referencing system.

An embodiment of the present invention provides a method for obtaining a local page number of a point of interest (POI) within a geographic referencing system relative to a local page and grid numbering system (LPGNS). Location data of a point of interest (POI) located within a local identifying area is acquired. The location data comprise an "xp" coordinate and a "yp" coordinate relative to the geographic referencing system. A universal page number within the LPGNS of the POI is determined from the xp and yp coordinates of the POI. In an embodiment of the present invention, determining the universal page number of the POI from the xp and yp coordinates of the POI comprises obtaining parameters defining the LPGNS, wherein the LPGNS comprises a universal page number array comprising universal array elements. Parameters defining the LPGNS comprise a universal page number array having "X" rows and "Y" columns, a universal page height, and a universal page width. A column "C" of the universal page number array containing the POI is determined, wherein C=xp/(universal page width), the remainder ignored and the quotient increased by one. A row "R(b)" of the universal page number array containing the POI relative to a last row of the universal page number array is determined, wherein R(b)=yp/(universal page height), the remainder ignored. A row "R(t)" of the universal page number array containing the POI relative to a first row of the universal page number array is determined, wherein R(t)=X−R(b). The universal page number "P" of the POI is determined, wherein P=(R(t)−1)*250+C.

A keystone page number of a keystone page within the LPGNS of the local defining area is obtained. The local page number of the POI relative to the keystone page number is determined, thereby facilitating selecting a map page comprising the POI. In an embodiment of the present invention, the map page comprises an electronic file within a global positioning system (GPS) receiver and the process of selecting the map page comprising the POI is performed by the GPS receiver.

In an embodiment of the present invention, determining the local page number of the POI relative to the keystone page number comprises obtaining parameters defining the LPGNS, wherein the LPGNS comprises a universal page number array comprising universal array elements. Parameters defining the LPGNS comprise a universal page height, and a universal page width, and wherein the LPGNS further comprises a local page block array having "Yl" columns. The parameters of the center of the keystone page, xk and yk, are determined relative to the geographic referencing system. The column page "Ck" within the LPGNS containing the keystone page is determined, wherein Ck=xk/(page width), the remainder ignored and the quotient increased by one. A row page "Rk" within the LPGNS containing the keystone page is determined, wherein Rk=yk/(page height), the remainder ignored and the quotient increased by one. A column page "Cp" within the LPGNS containing the POI is determined, wherein Cp=xp/(page width), the remainder ignored and the quotient increased by one. A row page "Rp" within the LPGNS containing POI is determined, wherein Rp=yp/(page height), the remainder ignored and the quotient increased by one. A column offset "ColOffset" of the POI relative to the keystone page is determined, wherein ColOffset=Cp−Ck, the remainder ignored and the quotient increased by one. A row offset "RowOffset" of the POI relative to the keystone page is determined, wherein RowOffset=Rp−Rk. A local page number "Lp" of the POI is determined, wherein Lp=keystone page number+ColOffset−(Yl*RowOffset).

Embodiments of the present invention produce maps of local defining areas using the various methods described herein.

DESCRIPTION OF THE DRAWINGS

FIG. 4A illustrates a map of a sample study area—central Florida—with an array of 50×50 map page boundaries indicated according to an embodiment of the present invention.

FIG. 4B illustrates a map of a portion of the study area—Tampa Bay metro area Florida—with the page boundaries indicated according to an embodiment of the present invention.

FIG. 4C illustrates a map of a portion of the study area—Citrus County, Florida—with the page boundaries and the LPGNS page numbers indicated according to an embodiment of the present invention.

FIG. 5 illustrates a map of a portion of the study area—Hillsborough County,, Florida—with the page boundaries and the LPGNS page numbers indicated according to an embodiment of the present invention.

FIG. 6 illustrates a map of a portion of the study area—Citrus and Hernando, Florida—with Citrus County-based local page numbers indicated according to an embodiment of the present invention.

FIG. 7 illustrates a map of a portion of the study area—Citrus, Florida—with Citrus County-based local page numbers indicated according to an embodiment of the present invention.

FIG. 8 illustrates a map of a portion of the study area—Citrus, Florida—with Citrus County-based local page numbers indicated, indicating keystone page 500 according to an embodiment of the present invention.

FIG. 9 illustrates a map of a portion of the study area—Hernando, Florida—with Citrus County-based local page numbers indicated according to an embodiment of the present invention.

FIG. 10 illustrates a map of a portion of the study area—Pasco, Pinellas and Hillsborough, Florida—with Hillsborough County-based local page numbers indicated according to an embodiment of the present invention.

FIG. 11 illustrates a map of a portion of the study area—Pasco, Florida—with Hillsborough County-based local page numbers indicated according to an embodiment of the present invention.

FIG. 12 illustrates a map of a portion of the study area—Hillsborough, Florida—with Hillsborough County-based local page numbers indicated, indicating keystone page 500 according to an embodiment of the present invention.

FIG. 13 illustrates a map of a portion of the study area—Hillsborough, Florida—with Hillsborough County-based local page numbers indicated according to an embodiment of the present invention.

FIG. 14 illustrates a map of a portion of the study area—Hernando and Pasco, Florida—with Citrus and Hillsborough County-based local page numbers indicated according to an embodiment of the present invention.

FIG. 15 illustrates a map of a portion of the study area—Hernando and Pasco, Florida—with Citrus and Hillsborough County-based local page numbers indicated according to an embodiment of the present invention.

FIG. 16 illustrates a map of a portion of the study area—Citrus, Hernando and part of Pasco, Florida—with Pasco County-based local page numbers—based on non-default page width of 30 pages—indicated according to an embodiment of the present invention.

FIG. 17 illustrates a map of a portion of the study area—Pasco Pinellas and Hillsborough, Florida—with Pasco County-based local page numbers—based on non-default page width of 30 pages—indicated according to an embodiment of the present invention.

FIG. 18 illustrates the universal and local page numbers and coordinates of the keystone page of Hillsborough, Florida FIG. 19 illustrates the universal and local page numbers and coordinates of page 622 of Hillsborough, Florida

DETAILED DESCRIPTION

Figure 1:
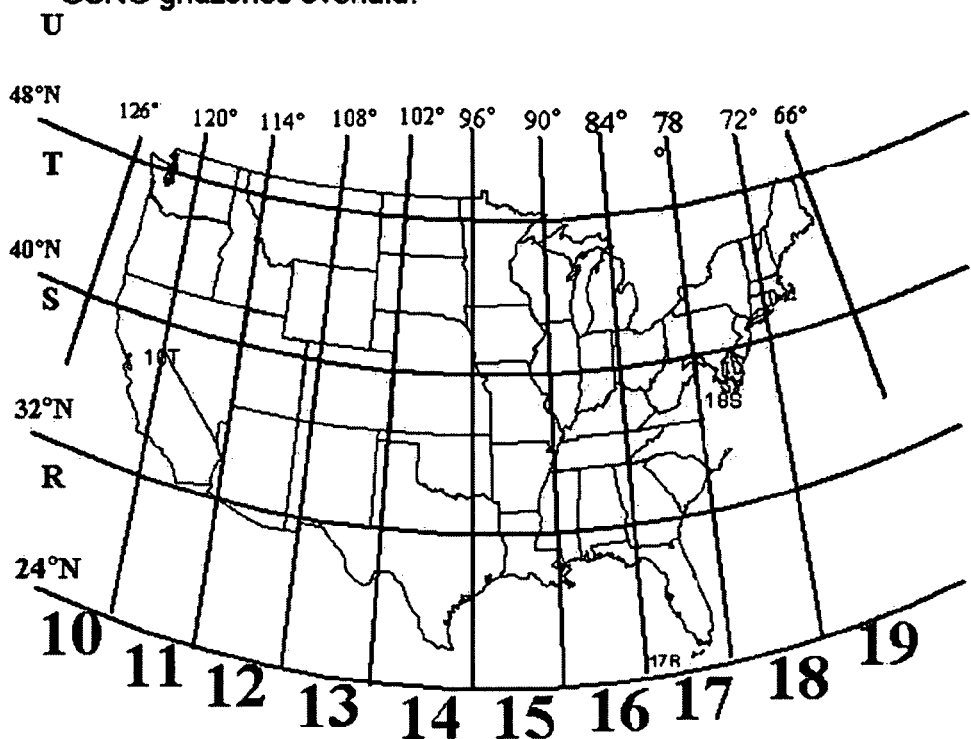
FIG. 1 illustrates a map of the continental U.S. with the UTM zones (10-19) and USNG gridzones (10R, 10S, . . . , 19T) overlaid as known in the prior art.

The description of the present invention that follows utilizes a number of terms the definitions of which are provided below for the sake of clarity and comprehension:

| | |
|---|---|
| Alignment point | A point located within a local defining area that is deterministically defined as a function of the local defining area polygon. A centroid is one example of an alignment point. |
| Bounding box | The smallest rectangle that contains a local defining area for which local pages are to be assigned (i.e., of a size sufficient to circumscribe the local defining area) and whose sides are parallel to the x- and y-axis. |
| centroid | The geographic center of a local area; the center of gravity of a polygon. |
| FIPS | Federal information processing standards codes (FIPS codes) are a standardized set of numeric or alphabetic codes issued by the National Institute of Standards and Technology (NIST) to ensure uniform identification of geographic entities through all federal government agencies. |
| GPS | Global positioning system. |
| Keystone page | The LPGNS local page which defines the local page numbers associated with the local area or civil division. The keystone page is assigned a constant number and thereby determines the local page numbers of adjacent pages. In specific implementations of the LPGNS, the keystone page may also be referred to as the centroid page. |
| Local page block height | The height of the block of pages that contains the local pages. |
| Local page block width | The width of the block of pages that contain the local pages. |
| Local Page Block | The rectangular array of pages that are assigned local page numbers by the LPGNS system. |
| LPGNS | Local page and grid numbering system. |
| origin | The starting point of a map where (x,y) coordinates are (0,0) |
| TSR | Township-and-Range. |
| USNG | U.S. national grid. A federally recognized grid system that overlays the UTM projections. |
| UTM | Universal Transverse Mercator. A grid system in which the world is divided into 60 north-south zones, each covering a strip 6° wide in longitude. These zones are numbered consecutively beginning with Zone 1, between 180° and 174° west longitude, and progressing eastward to Zone 60, between 174° and 180° east longitude. |

In an embodiment of the present invention, an algorithm converts the coordinates of a common projection to a unique page determined by a Local Page and Grid Number System (LPGNS). The unique pages are assigned "universal" page numbers. Local defining areas (for example and without limitation, counties in the U.S.) are selected. A deterministic method of defining an "alignment point" within the local defining area is applied. A local page block array comprising the local pages for a local defining area is defined. A keystone page within the local page block array is defined and aligned with the universal page number containing the alignment point. Local page numbers are assigned to the universal page numbers relative to the keystone page number. By way of illustration and not as a limitation, the common projection may be a UTM-based projection, a state plane projection, or other system of coordinate projection. For the sake of clarity, exemplary embodiments of the present invention will be described in terms of a UTM projection.

In an exemplary embodiment of the present invention, an algorithm converts the coordinates of a common projection (such as UTM) to a unique page within a Local Page and Grid Numbering System (LPGNS). In this embodiment of the present invention, the algorithm resides in a GPS unit and converts the projection coordinates to the LPGNS local page and grid reference. However, this is not meant as a limitation. The algorithm may be applied to the projection of coordinates in a computing device separate from the GPS unit.

In another exemplary embodiment of the present invention, LPGNS pages are generated from the grids of the UTM projection. Two types of page numbers are generated: (1) universal pages that are unique and cover the entire zone; and (2) local pages which cover only a small, local portion of the zone. A unique "universal" LPGNS page number is assigned to each page in each UTM zone. One or more local page numbers are assigned to each LPGNS page so as to link the numbering system to the local geography. In an embodiment of the present invention, this link is established by identifying a fixed point representing the geometric center (the "centroid") of a bounding box that encloses a local area (for example, a county or other civil division) to be tiled into pages. The LPGNS page that includes the centroid is assigned a common, constant local page number. In an embodiment of the present invention, the "centroid" page—which is also called the "keystone" page—the located at the center page block and assigned a constant number relative to the page block. In an exemplary embodiment, the page block 40 "universal" pages wide and twenty-five "universal" pages in height and the keystone page is assigned local page number 500. However, this is not meant as a limitation. Other page blocks dimensions may be used and other keystone pages assigned without departing from the scope of the present invention. In the exemplary embodiment, the 1000 local pages in the page block that surrounds the centroid (or "keystone") page are identified by their offset from the keystone page, thereby linking the numbering system to the local geography.

In yet another embodiment of the present invention, the keystone page is determined by finding the universal page in which the centroid of the local area is located.

FIG. 1 illustrates a map of the continental U.S. with the UTM zones and USNG gridzones overlaid as known in the prior art. As illustrated in FIG. 1, UTM zones are integers (e.g., 17 and 18) and USNG zones are integers plus letters (e.g., 17R and 18S). UTM and USNG coordinates read from left to right and bottom to top, in contrast to a set of Page and Grid Numbering systems, which read from left to right and top to bottom, that can be used for tiling of published maps and as a supplementary grid reference.

Figure 2:
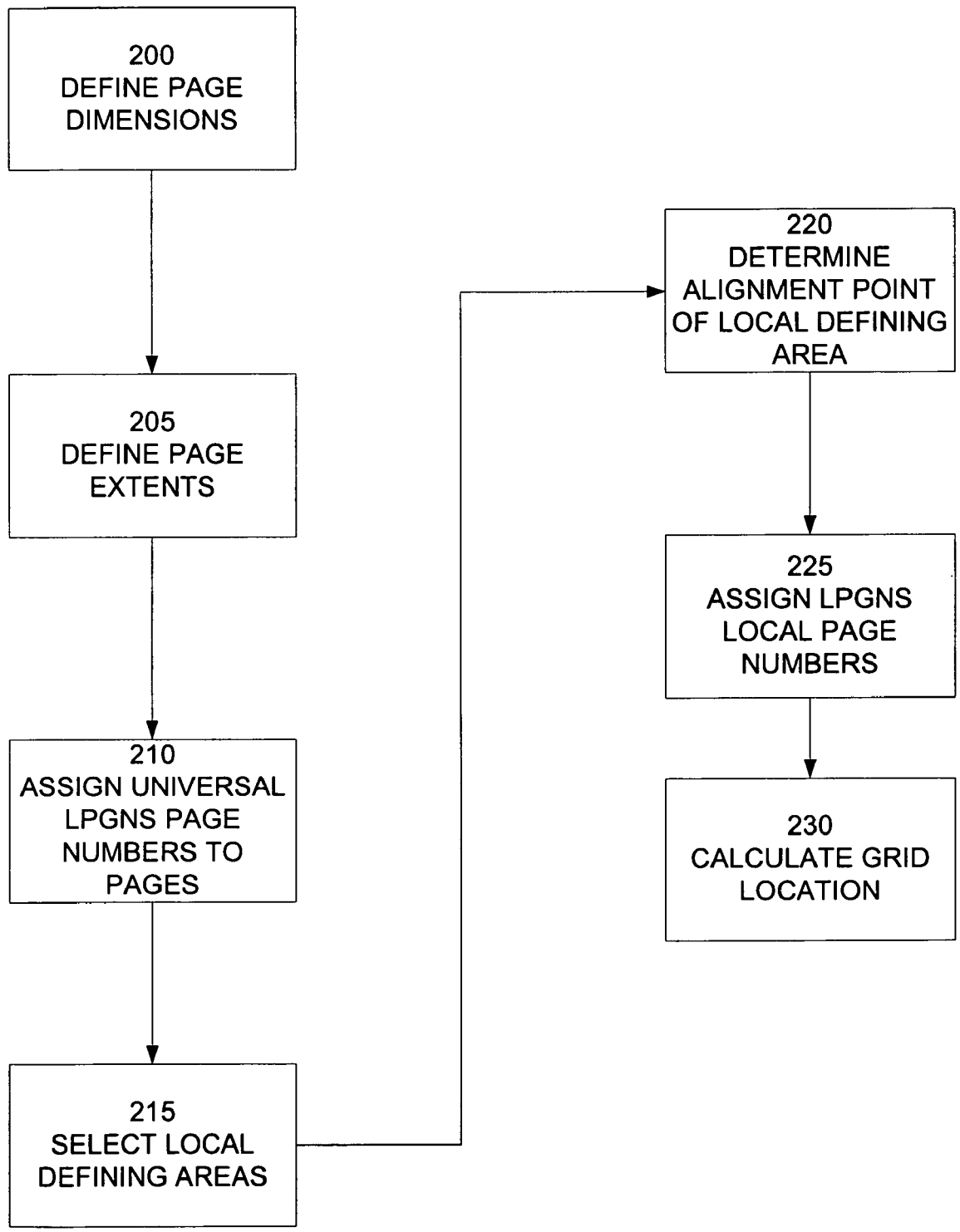
FIG. 2 illustrates a process by which universal LPGNS page numbers are generated from the grids of a UTM (or other) projection according to an embodiment of the present invention.

FIG. 2 illustrates a process by which universal and local LPGNS page numbers are generated from the grids of a UTM projection according to an embodiment of the present invention. Referring to FIG. 2, the page dimensions are defined 200.

In an exemplary embodiment, the page dimensions are four columns by six rows. The page width is 4000 meters and the page height is 6000 meters. However, this is not meant as a limitation. As will be described below, other page dimensions may be defined without departing from the scope of the present invention. The exemplary embodiment reflects the requirement to translate grid coordinates to a page and grid system that supports publication at scale of 1:24000 on a standard 8.5 by 11 inch page.

Using the parameters of the exemplary embodiment for illustration, the size of the grid is one kilometer square. The page size is defined in terms of grid columns and grid rows. The standard page is 8.5×11 inches. Allowing for material that surrounds the map content ("mapsurrounds"), the map page will be about 7 inches to 7.5 inches wide and 9.5 inches to 10 inches in height. The best fit at scale of 1:24000 is four columns and six rows as follows:

| Page columns | 4 km = 2.5 mi | 6.6 in |
| Page rows | 6 km = 3.7 mi | 9.8 in |
| Page grids | 24 sq. km = 9.2 sq mi | 64.7 in |

The LPGNS page extents are defined 205.

In an exemplary embodiment of the present invention, for each UTM zone, a page array of 250 columns and 1400 rows is defined. In this embodiment, the pages are 4000 meters wide and 6000 meters in height. They are measured from the center of the UTM zone at the equator. In this embodiment, the LPGNS pages form an array of 250 by 1400 pages, a total of 350,000 pages. The page height times the number of pages yields a distance of 8,400,000 meters, slightly less than the distance from the equator to the Artic Circle. As would be appreciated by those skilled in the art, arrays of varying size may be used without departing from the scope of the present invention. The page extents selected for the exemplary embodiment are for illustrative purposes only and are not intended to be limiting.

LPGNS universal page numbers are assigned to each page 210.

In an exemplary embodiment of the present invention, the array of 350,000 pages is numbered 1 to 350,000. Row 1 is numbered one to 250, row 2 is numbered 251 to 500, and so forth. In this manner all pages are assigned a unique identifier. These pages are considered "universal" because they cover all the pages in the system. The unique ID in this exemplary embodiment contains one to six digits.

Local defining areas are selected 215.

In an exemplary embodiment of the present invention, the LPGNS local page numbers are determined for the U.S. and the local defining areas are counties. However, this is not meant as a limitation. By way of illustration, a local defining area comprises a local civil jurisdiction as defined by a government authority. Every local defining area that is to be mapped at the local scale (typically 1:24000) is paginated according to a system that provides a local page and grid for every point in the local defining area. In an embodiment of the present invention, the local area covered by the page and grid mapping system is a rectangle 160 kilometers wide and 150 km in height, for a total of 24,000 square kilometers in area or about 9,000 square miles. The rectangle surrounds and is adjacent to the keystone page (described below).

The alignment point for each local defining area is determined 220. In this exemplary embodiment, the alignment point is the centroid of a bounding box that circumscribes the local defining area. The LPGNS page that contains the centroid is identified as the "keystone page." The keystone page is identified using a bounding box as follows:

Create the bounding box of the polygon

Find the centroid (or other central point of the polygon)

Define the keystone page as the page that contains the centroid

As will be appreciated by those skilled in the art, other means may be used to identify the keystone page. By way of illustration and not as a limitation, the keystone page is identified using the centroid of the local defining area.

LPGNS local page numbers are assigned 225.

The rectangle containing all the local pages for a local defining area is called the local area's "page block." In the exemplary embodiment, the page block is 40 pages in width and 25 pages in height and contains one thousand pages. The local page numbers for this page block are defined as follows:
Extend the pages east-west and north-south to cover the bounding box.
Identify the keystone page at midpoint of bounding box as page 500
Fill out rectangular array of 1000 pages as follows:
  Extend the pages to reach 19 page widths to east and 20 pages west of keystone page, i.e.
    The pages extend from 480-519
    Page block area width is 40*4 km=160 km
  Extend pages to reach 12 pages north and 12 pages to the south of keystone page, i.e.
    The pages to the north of keystone are numbered <460, 420, 380, 340, 300, 260, 220, 180, 140, 100, 60, 20>
    The pages to the south of keystone are numbered <540, 580, 620 660, 700, 740, 780, 820, 860, 900, 940, 980>
    The page block area height (north to south extent) is 25*6 km=150 km
  Extend all above pages horizontally and vertically to fill out the 1000-page rectangle defined in steps one and two above.

In the exemplary embodiment, the "keystone" page is numbered page 500 and defines the extent of the local page system. The keystone page is defined for each of the local defining areas intended to be covered by the page system. For example every county in the U.S. (or similar administrative area worldwide) is assigned as its keystone page the page that includes the alignment point of the county. Using this system, every area is defined uniquely in terms of its local defining area and its LPGNS local page and grid.

The local page numbering system is applied to every local defining area to create a local page numbering system useful for emergency response and other local requirements. The system is applied to all major metropolitan areas and other appropriate multi-juridictional areas to provide a local page system useful for metropolitan uses that cover multi-jurisdictional areas.

The area covered by the page block used to implement the local page numbering system of the exemplary embodiment is about 9,000 square miles which is sufficient for almost every county, metropolitan area and other area suitable for detailed street mapping in the U.S. Other parameters can be used to assure complete coverage of the U.S. It is also suitable for street mapping elsewhere in the world.

The grid location is then calculated 230. In an exemplary embodiment of the present invention, the grid within each page will be the standard alpha column, row number. In this exemplary embodiment, the page/scale of 24000 comprises four columns by six rows. The grid labeling is A-D, 1-6 as follows:

| A1 | B1 | C1 | D1 |
| A2 | B2 | C2 | D2 |
| A3 | B3 | C3 | D3 |
| A4 | B4 | C4 | D4 |
| A5 | B5 | C5 | D5 |
| A6 | B6 | C6 | D6 |

In the U.S., the main local page numbering system in the LPGNS is the county system, which supplements the UTM projection, described above. The USNG is an extension of the UTM projection. The LPGNS also works as a supplement to the USNG system. The local page system can also be applied to the USNG subsubzones to create a set of consistent local page numbers for all parts of the continental U.S. (and beyond). There are ten UTM zones in the continental U.S., zones 10-19. In the USNG system, each zone is divided into several subzones, which are called "Grid Zone Designations" or "GZDs". For example, zone 17 is divided into subzones (GZDs) 17R, 17S, 17T, and 17V in the continental U.S. See FIG. 1.

Each subzone is further divided into subsubzones which are labeled with two characters. These are called "100,000-meter Square Identifiers" For example, Washington D.C. is in subsubzone UJ of subzone 18S and Tampa, Fla. is in subsubzone LL of subzone 17R. Each subzone measures 100 km square. The lower left corner (origin) of each subsubzone ("100,000-meter Square") has coordinates that are an integer multiple of 100 kilometers. For example, the origin of subzone 18S, subsubzone UJ is the point x=300000, y=4300000. Subsubzone UJ includes all points with coordinates (x,y) where 300,000<x<400,000 and 4,300,000<y<4,400,000.

The centroid of subsubzone UJ will be in the center of the 100 km by 100 km square, at point x=350,000, y=4,350,000. The 9000 square mile local page system can be applied to each zone. As a result, each subsubzone page is numbered with 8-9 alphanumberics. For example 18S UJ 501 is
a page 501
near the center of subzone UJ
in UTM Grid Zone 18S

Each universal and local page system is a function of the dimensions (height and width) of its map page. The dimensions of its map page are in turn a function of its map scale. The LPGNS system may be applied to various page sizes and scales. In the exemplary embodiment described above, the U.S. page size is 8.5×11 inches and the default map scale is 1:24000 or one inch to 2000 feet, a common scale for street maps. The default dimensions of the grid are width of four columns and height of six rows.

In an embodiment of the present invention, an alternate page size is 11×14 inches for large format publications (also using a scale of 1:24000). This alternative page size uses parameters that differ from the parameters discussed in the context of the exemplary embodiment. For example, the following parameters would be appropriate for a large-format atlas using 11×14 inch paper:

| Projection | UTM |
| --- | --- |
| Columns per page | 6 |
| Rows per page | 8 |
| Page number digits | 3 |
| Page block rows | 25 |
| Page block columns | 40 |
| Page number of keystone page | 500 |

The page dimensions yield a page area of 48 km$^2$ compared to 24 km$^2$ for the dimensions described in the exemplary embodiment. The larger page dimensions in this alternative enables the local page numbering system to cover an area that is twice the area of the system described in the exemplary embodiment.

Another example of the flexibility of present invention is in creation of a large-scale atlas. In this embodiment, the scale is scale 1:12,000 using a page size of 8.5×11. The parameters for this implementation would be as follows:

| Projection | UTM |
| --- | --- |
| Columns per page | 2 |
| Rows per page | 3 |
| Page number digits | 3 |
| Page block rows | 25 |
| Page block columns | 40 |
| Page number of keystone page | 500 |

This alternate embodiment would cover approximately 2,250 sq miles, which would be sufficient for some counties and other civil divisions.

For most counties or other jurisdictions, the page block width of 40 pages and height of 25 pages described in the context of the exemplary embodiment is appropriate. However, for some counties or other jurisdictions, the shape of the county polygon may require a wider or narrower block of pages for optimum coverage. As will be appreciated by those skilled in the art, other page block dimensions may be used without departing from the scope of the present invention. In other embodiments of the present invention, local coverage may require fewer or greater number of pages than are used in the exemplary embodiment. A change in the local coverage page number may also lead to a change in the numbering of the keystone page. By way of illustration and not as a limitation, if the local cover is extended from 1000 to 1600 pages, the keystone page number may be changed from 500 to 800.

Figure 3:
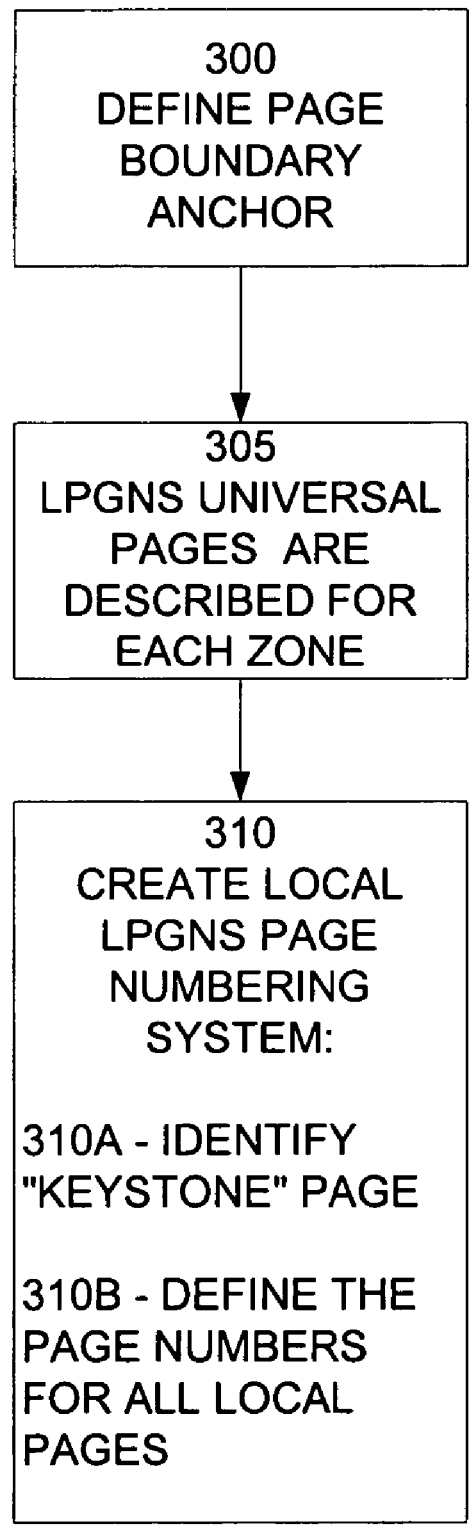
FIG. 3 illustrates a process in which a LPGNS system is employed in a map publishing application according to embodiments of the present invention.

FIG. 3 illustrates a process in which a LPGNS system is employed in a map publishing application according to embodiments of the present invention. As noted above the LPGNS is a system for defining map pages and grids based on the number of columns and rows, measured in integers in terms of grids, per page.

The process illustrated in FIG. 3 utilizes a LPGNS page numbering and grid numbering system generated using a set of "default" parameters set forth below:

| Projection | UTM |
| --- | --- |
| Page size | 8.5 × 11 inches |
| Columns per page | 4 |
| Rows per page | 6 |
| Page number digits | 3 |
| Page block rows | 25 |
| Page block columns | 40 |
| Page number of keystone page | 500 |
| Grid size | 1,000 m |
| Page Height | 6,000 m |
| Page Width | 4,000 m |

As will be appreciated by those skilled in the art, the "default" parameters are provided for illustrative purposes only and not as limitations. For the purpose of the discussion that follows, a map application is directed to a five-county portion of west central Florida (referred to below as the "pilot area") comprising the following counties:

| County | FIPS Code |
| --- | --- |
| Citrus | 12017 |
| Hernando | 12053 |

-continued

| County | FIPS Code |
| --- | --- |
| Hillsborough | 12057 |
| Pasco | 12101 |
| Pinellas. | 12103 |

In an embodiment of the present invention, the LPGNS pages were defined using ESRI's ArcView Geographic Information System (GIS) computer mapping software that includes graphic features (points, lines, polygons) and attributes (such as county name, FIPS codes, or page numbers, centroid x value, centroid y value). The vector data is in the form of "ESRI shape files." The Arc/Info command generate with the fishnet option was used to create the map layer of grids and pages used in this example. Structured query language formulas were used to populate the rectangular polygon records with their local page numbers as a function of the coordinates of their centroids using the logic described below. As will be appreciated by those skilled in the art, other means of generating the LPGNS pages may be used without departing from the scope of the present invention.

A page boundary anchor point is defined 300, which is the point from which the universal and local LPGNS pages in the zone will be offset. As described above, in the northern hemisphere, page boundaries are defined from a location 500,000 meters east of the origin (0,0) of the UTM zone, at the central meridian, in the "lower center" of the zone. For the zone that contains Florida, UTM Zone 17, this "page boundary anchor point" is located by definition on the equator at latitude=0, longitude=81 degrees west. (see FIG. 1).

West central Florida is located far to the north and slightly to west of the page boundary anchor point. The pilot area is within a range of approximately 300,000 to 400,000 meters east ("easting" or x-value) and 3,000,000 to 3,200,000 meters north ("northing" or y-value) of the origin. In terms of USNG, the pilot area is in sub-sub-zones 17 R LL and 17 R LM.

LPGNS universal pages are described for each zone 305. In the UTM projection in the northern hemisphere, there are 60 zones, numbered from one (1) through sixty (60). The continental U.S. is located within eleven such zones, from 10 on the west coast to 19 for eastern New England. (See FIG. 1).

Each zone is 1,000,000 meters wide and approximately 8,400,000 meters in height. Since this illustrative example has page width of 4,000 meters and page height of 6,000 meters, there are 250 pages in a row and 1,400 pages in a column, for a total of 350,000 LPGNS "universal" pages per zone. The page height times the number of pages yields a distance of 8,400,000 meters, slightly less than the distance from the equator to the Artic Circle. As would be appreciated by those skilled in the art, arrays of varying size may be used without departing from the scope of the present invention. The page extents selected for the exemplary embodiment are for illustrative purposes only and are not intended to be limiting.

In this example, the page boundaries could have been drawn from the page boundary anchor point or from the zone 17 origin at the Equator, but this would have created an excessive number of pages in the GIS software. Therefore, a local set of page boundaries in the shape of an array or "eggcrate" was created with the GIS software, starting from a point (a "local origin") that represented a page corner and was located a short distance to the south and west of the subject area.

Since this illustration of the system has pages that are defined as four grids by six grids, the local origin point had an x-value divisible by 4,000 and a y-value divisible by 6,000. The point chosen as the lower lefthand corner of the "egg-crate" was x=316000, y=3054000. The x-value places this point between the $79^{th}$ and $80^{th}$ column of the 250 columns of pages that cover the UTM zone; the y-value places this point between the $891^{st}$ and $892^{nd}$ rows of the 1400 rows of pages that cover the UTM zone. This point is in the southwest corner of the page defined by column 80 and row 891 of the 350,000 page array in this UTM zone.

The page boundaries were defined by drawing vertical lines (north to south) every 4,000 meters from the local origin point, and by drawing horizontal lines (east to west) every 6,000 meters from the local origin. The lines were combined to form a set of rectangular polygons. This created a "fishnet" or set of rectangles 4,000 m by 6,000 m or 24 km2 in area.

For this illustration, a "fishnet" array of pages was created with 50 page-rows and 50 page-columns, to create a 2500-page array, which covers an area that measures 50×4,000 meters=200 km wide and 50×6,000 meters=300 km north-to-south, a total of 60,000 km$^2$ and which covers the subject area with room to spare. (See FIGS. 4A and 4B.)

For this embodiment of the present invention, the page width is 4,000 meters and page height is 6,000 meters. Thus, there are 250 pages in a row and 1,400 pages in a column, for a total of 350,000 LPGNS "universal" pages. Six digits page numbers are sufficient within each zone to cover all pages created. These page numbers are numbered sequentially by row from the upper left, from 0 to 249 in row 1, 250 to 499 in row 2, and so on to row 1400, where pages are numbered from 349,750 to 349,999. The full "universal" page number is the zone appended to the page number. For the pilot area (zone 17), is in the form of:

LPGNS Page 17 nnnnnn, where 0<=nnnnnn<=349999

The process for calculating the LPGNS "universal" page number of a point location is as follows:
Let point location=x,y
Calculate Page Column=c, then c is the largest integer for which 4000c<x
Calculate Page Row Up=ru, then ru is the largest integer for which 6000r<y
Calculate Page Row Down=rd, then rd=1400−ru
Calculate Page Number=(250*rd)+c
See FIGS. 4C, 5, 12, 14 15, 18 and 19.

A local LPGNS page numbering system is created for the desired area 310. In an embodiment of the present invention, a local LPGNS numbering system is created for each county within the pilot area. Implementing this embodiment would result in a local page numbering system with 1000 pages per county. An alternate embodiment of the present invention emulates a process of a typical map publisher in which the local page numbering system is created for a larger than one-county local area, thereby reducing overlap and simplifying the system. In this alternate embodiment, two "host" counties were chosen to illustrate the definition of the LPGNS local page system, one "host" county for the two northern-most counties and one "host" county for the three southern counties. (See FIGS. 6 to 13).

For each host county, the LPGNS local pages are defined by first identifying the "keystone" page 310A as follows:
Identify the coordinate range that defines the bounding box of the subject county, adjusted to include the entire page that the extreme values are located in.
Bounding box is defined by four values, pagexmin, pagexmax, pageymin, pageymax
PageXmin is lowest x value in a page that contains a portion of the county (western-most point)
PageXmax is the highest x value in a page that contains a portion of the county (eastern-most point)
PageYmax is the highest y value in a page that contains a portion of the county (northern-most point)
PageYmin is the lowest y value in a page that contains a portion of the county (southern-most point)
Identify the center of the "page" bounding box.
Calculate pagexcen=pagexmin/2+pagexmax/2
Calculate pageycen=pageymin/2+pageymax/2
Center of page-bounding box is point pagexcen, pageycen
Let the page that contains the center of the bounding box be the keystone page.
If center is on a page boundary, default east and north
Set the LPGNS keystone page number to 500

The keystone page is used to uniquely define the page numbers for all local pages 310B. (See FIGS. 6, 8, 10, 12 and 18.) The local page unique identifier for each local page is the FIPS code (five digits of which two are for the state and three are for the county) appended to the three-digit local page number. For example the keystone page for Citrus is 12017500, for Hernando is 12053500, Hillsborough is 12057500, Pasco is 12101500, and for Pinellas is 12103500. (The keystone pages for Hillsborough and Citrus Counties are shown in FIGS. 6, 8 and 12). Note that there is some overlap of local page numbers, so that, for example Hillsborough page 102=Citrus page 824. However, each of these pages is exactly the same, in fact, they are each exactly the same as the LPGNS "universal" page (17-218842). (See FIGS. 14, 15)

It is possible to change the parameters of the local page block; for example, if the width of the block is reduced from forty to thirty pages then it is possible to cover the five Florida counties with one instead of two local page systems (See FIGS. 16 and 17).

Figure 4:
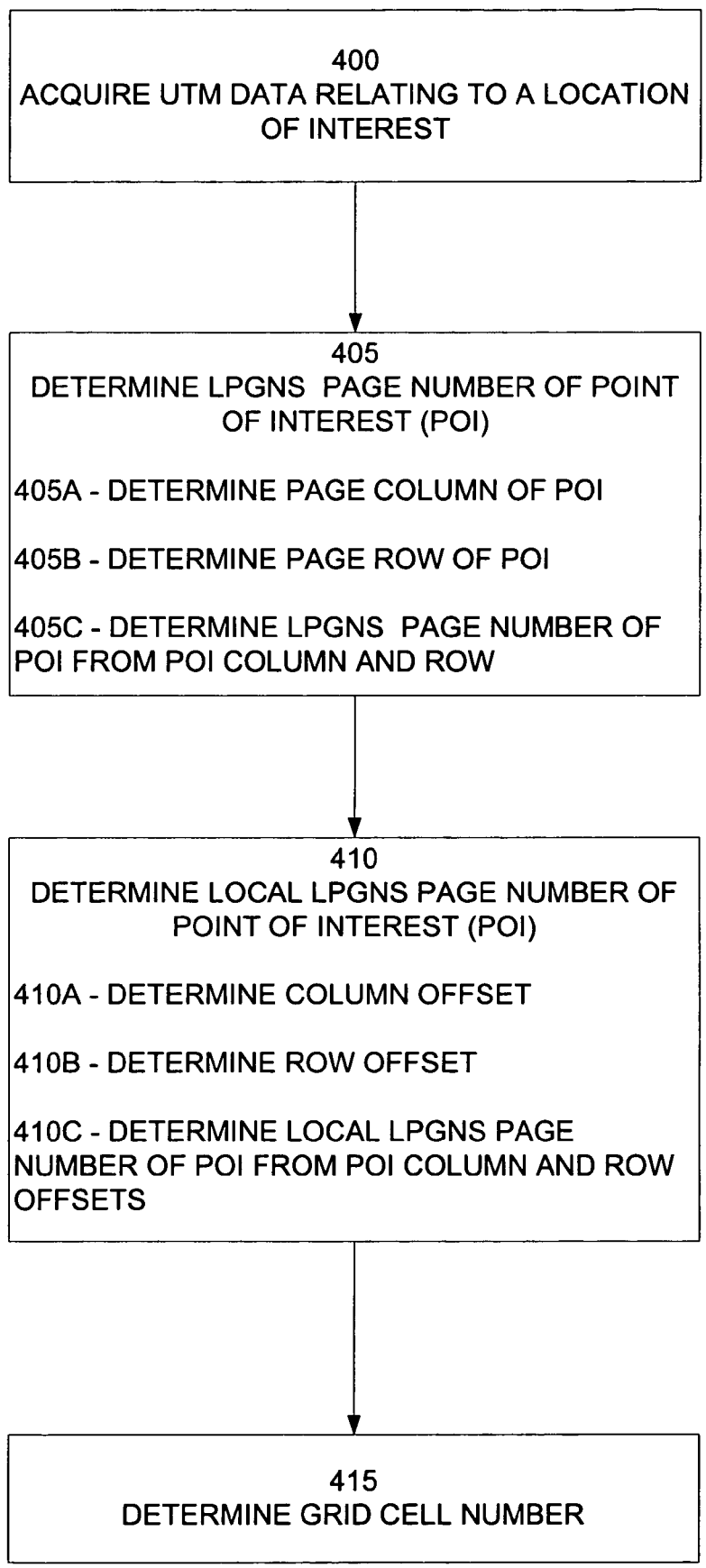
FIG. 4 illustrates a process that enables a user to obtain LPGNS page and grids of a location from UTM data according to embodiments of the present invention.

FIG. 4 illustrates a process that enables a user to obtain LPGNS page and grids of a location from UTM data according to embodiments of the present invention. The process illustrated in FIG. 4 utilizes a LPGNS page numbering and grid numbering system generated using a set of "default" parameters set forth below:

| Projection | UTM |
|---|---|
| Page size | 8.5 × 11 inches |
| Columns per page | 4 |
| Rows per page | 6 |
| Page number digits | 3 |
| Page block rows | 25 |
| Page block columns | 40 |
| Page number of keystone page | 500 |
| Grid size | 1,000 m |
| Page Height | 6,000 m |
| Page Width | 4,000 m |

As will be appreciated by those skilled in the art, the "default" parameters are provided for illustrative purposes only and not as limitations. For the purpose of the discussion that follows, Hillsborough County, Florida has been selected as a location of interest.

Using the process illustrated in FIG. 4, this invention's algorithm enables one to create a computer program that can be included in a GPS unit or other device to translate the x,y coordinates created by the GPS unit into the page and grid of the LPGNS, which can then be displayed on the GPS unit. The algorithm is described separately below.

The process begins with the acquisition of the UTM data relating to a location of interest 400. For the purpose of the discussion that follows, Hillsborough, Florida has been selected as a location of interest. By way of illustration, a GPS unit, a map, a computer program or a text file may provide the UTM data. The UTM data comprises:

UTM Zone

UTM Coordinates, P=(x, y), where x and y are in meters

Federal information processing standard (FIPS) code of county or independent city for local map generation (e.g. Hillsborough,, Florida=12057)

Using the UTM data, the LPGNS "universal" page number is determined 405. The LPGNS universal page number is a function of its row and column in the array of pages. In an exemplary embodiment of the present invention, for each UTM zone, a page array of 250 columns and 1400 rows is defined. In this embodiment, the pages are 4000 meters wide and 6000 meters in height. They are measured from the center of the UTM zone at the equator. In this embodiment, the LPGNS pages form an array of 250 by 1400 pages, a total of 350,000 pages.

Using the "default" parameters established for this embodiment, the page column is determined by dividing the page width (4000 meters) into the x-coordinate of the point of interest (the remainder is ignored and the quotient to the left of the decimal point increased by one) 405A. By way of illustration, if x=374,000, then page-column=374,000/4, 000=93.5. The page column is 94. The point is located in the $94^{th}$ column of the array.

Using the "default" parameters established for this embodiment, the page row relative to the last row (that is, row 1400) is calculated into dividing the page height (6000 meters) into y coordinate (the remainder is dropped) 405B. By way of illustration, if y=3,069,000, then the page-row (from bottom)=3,069,000/6,000=511.5. The page row from the bottom is 511. The page row relative to the top row is obtained by subtracting the page row relative to the last row from the number of rows. Using the "default" parameters established for this embodiment, the page row relative to the first row is 1400−511=889. The point is located in the $889^{th}$ row of the array.

The LPGNS universal page number is calculated 405C using the following formula:

*LPGNS* Page Number=(page row relative to first row*250)+(page column relative to first column)

The first row is row 1, the page row calculated above is row 889 so the "page row relative to first row" is 889−1=888

The first column is column 1, the page column calculated above is 94 so the "page column relative to first column" is 93.

Applying the formula to the values determined previously, the LPGNS Page Number=(888*250)+93=222000+93=222093.

As described in reference to FIG. 3, a local page system for each county has been established. For each county the centroid of its bounding box has been identified and overlaid on the array of LPGNS pages and the LPGNS page that contains the centroid has been identified. Based on the "default" parameters established for this embodiment, the "keystone" page is assigned the local page number 500. For example, the counties of Citrus and Hillsborough identified in reference to the exemplary embodiment describe in reference to FIG. 3 are associated with the following parameters:

| County | FIPS Code | Keystone LPGNS Pg. Number | Xcentroid | Ycentroid |
|---|---|---|---|---|
| Citrus | 12017 | 12017500 | 358000 | 3195000 |
| Hillsborough | 12057 | 12057500 | 366000 | 3087000 |

The LPGNS local page number is determined 410. To calculate the LPGNS local page number, the row and column offset from the keystone page is determined. In an exemplary embodiment of the present invention, the centroid of the page is used to represent its page. An array of rectangles is represented by an array of points that are spaced 4000 m apart east to west and 6000 m apart from north to south.

The distance from the LPGNS page center of the point of interest to the keystone page center is determined, divided by 4000 and 6000 to calculate the number of columns and rows offset. The page number is determined by adding/subtracting 40 for each row and 1 for each column. To illustrate, the x, y coordinates of a point of interest are:

P=(374,000; 3,069,000)

The LPGNS page number is 222093 (see discussion in relationship to FIG. 3). Note that the center of page 222093 has the following coordinates (374,000; 3,069,000)

It has been determined that the county with FIPS code 12057 has keystone page 221341 which has coordinates of center at (366,000; 3,087,000). [See FIG. 18] The calculation of column and row page offsets is as follows:

Column offset=columnpage of subject point−columnpage of keystone 410A

Row offset=rowpage of subject point−rowpage of keystone 410B

The column page is determined by dividing the x coordinate of a point by 4,000, the remainder ignored and the quotient increased by one. Using the values associated with the exemplary embodiment, the column offset is:

(374,000/4000)−(366,000/4000)=94−92=2

The row page is determined by dividing a y coordinate of a point by 6,000, the remainder ignored and the quotient increased by one. Using the values associated with the exemplary embodiment, the row offset is:

3,069,000/6000−3,087,000/6000=512−515=−3

The LPGNS local page is therefore three rows down (south) and two columns to the right (east) of the keystone page.

The subject LPGNS local page number is calculated 410C as follows:

*LPGNS* local page of point of interest=500+column-delta−rowdelta

Columndelta=columnoffset

Rowdelta=40*rowoffset

Using the values associated with the exemplary embodiment, the In the example columnoffset=2 and rowoffset=−3, so Columndelta=2

Rowdelta=40*−3=−120

Subject local page=500+2−(−120)=622

The point of interest is on FIPS 12057, local page 622. (FIG. 19)

The grid cell location is calculated within the page 415. In an embodiment of the present invention, the grid cell location is calculated by determining the gridoffset from the upperleft corner of the page to the east and the south. The gridoffset is determined from the remainders that were discarded in the calculation of the LPGNS page number. The remaindercolumn divided by 1000 yields the grid column offset and the remainderrow divided by 1000 yields the grid row offset For example, the remainders calculated above were:
Remaindercolumn=2,000
Remainderrow=3,000
Divide by 1,000 to get the gridoffset which is
Gridoffsetcolumn=2
Gridoffsetrow=3
The lookup for gridoffsets to column/row are as follows:

| GRIDOFFSET COLUMN | COLUMN |
|---|---|
| 0 | A |
| 1 | B |
| 2 | C |
| 3 | D |
| 4 | Not Possible |
| GRIDOFFSET ROW | ROW |
| 0 | 6 |
| 1 | 5 |
| 2 | 4 |
| 3 | 3 |
| 4 | 2 |
| 5 | 1 |
| 6 | Not Possible |

In the exemplary embodiment, the grid location is C3.

Embodiments of the present invention may be used in a number of ways to improve the way maps are made and viewed. Each time a map publisher creates an atlas, a decision must be made as to what projection to use for the data, how to tile the data into pages for the atlas, and how to number the pages and how to name the grids. This local page and grid system is then used to crate an index for streets and other features in the atlas. Using LPGNS, the map publisher derives his local page and grid systems automatically by following the rules described above.

Each time a GPS user or other map user wants to look up a coordinate in a map atlas, a search must be performed of an index map whose coordinates do not align with the map pages. Pages of the atlas must then be searched manually to zero in on the coordinate. In an embodiment of the present invention, the GPS user can search an index map whose coordinates are aligned with the atlas pages, or search a simplified index. Either way the time for look up is reduced, and the user is directed to a page on which a point of interest can be found. Once the user is on the page he can find the grid more rapidly because the coordinates align with the grids on the page.

In another embodiment of the present invention, a GPS user can look up the page automatically, either by entering the coordinates into a program on a computer or, in the case of GPS units with a built in program, simply request a display of the LPGNS page and grid on the unit. This provides instant lookup of coordinates onto the page and grid of the map atlas. In yet another embodiment of the present invention, the automated lookup is performed on multiple points comprising waypoints on a route. In this embodiment, a device using the LPGNS can display a route by page and grid automatically so that the map user can track his route on the map atlas readily. This is much easier than doing a manual lookup for a set of coordinates, which is the current method.

As will be apparent to those skilled in the art, embodiments of the present invention may be used to improve emergency response, improve consumer street atlases, aid in navigation, and improve land use and transportation planning, to name a few. By way of illustration and not as a limitation, emergency responders may use embodiments of the present invention to use GPS coordinates together with published map atlases and computer maps to respond to emergencies, with a large measure of redundancy that is so valuable in times of emergency.

A system and method for establishing Local page and grid numbering system (LPGNS) in a geographic referencing system has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A method for assigning local page numbers to a geographic region within a geographic referencing system comprising:
   defining a universal page number array comprising universal array elements;
   overlaying the universal page number array on the geographic region;
   assigning a universal page number to each universal array element;
   selecting a local defining area;
   determining an alignment point of the local defining area;
   defining a local page block array of universal elements, wherein the local page block array comprises local page block array elements;
   assigning a local keystone page number to the universal array element in which the alignment point is located,;
   locating the keystone page within the local page block array;
   aligning the keystone page within the local page block array on the universal array element in which the alignment point is located;
   assigning a local page number to each local page block array element relative to the local keystone page; and
   creating a map publication of the local defining area comprising local page numbers associated with the geographic referencing system.

2. The method for assigning local page numbers to a geographic region of claim 1, wherein the geographic referencing system is selected from the group consisting of Universal Transverse Mercator, state plane, and Township-and-Range.

3. The method for assigning local page numbers to a geographic region of claim 1, wherein defining a universal page number array comprises:
   defining a universal page dimension in terms of a width and height;
   determining the number of universal page number array columns by dividing a vertical extent of the geographic region by the universal page width; and
   determining the number of universal page number array rows by dividing the horizontal extent of the geographic region by the universal page height.

4. The method for assigning local page numbers to a geographic region of claim 1, wherein assigning the universal page number to each universal array element comprises numbering the universal array elements consecutively beginning with array element [1,1].

5. The method of assigning local page numbers to a geographic region of claim 1, wherein a local defining area is selected from the group consisting of a county, a city, a region, a civil division, and a governing district.

6. The method of assigning local page numbers to a geographic region of claim 1, wherein determining the alignment point of the local defining area comprises:
   defining a bounding box comprising a rectangle situated horizontally and containing the local defining area, wherein the bounding box is of a size sufficient to circumscribe the local defining area; and
   determining the center of the bounding box.

7. The method of assigning local page numbers to a geographic region of claim 1, wherein determining the alignment point of the local defining area comprises determining the center of gravity of a polygon defined by the local defining area.

8. The method of assigning local page numbers to a geographic region of claim 1, wherein the local keystone page is approximately at the center of the local page block array.

9. The method of assigning local page numbers to a geographic region of claim 1, wherein overlaying the universal page number array on the geographic region comprises:
   determining a meridian of the geographic region; and
   aligning a column boundary between universal array elements with the meridian.

10. A map of a local defining area produced by the method of claim 1.

11. A map of a local defining area produced by the method of claim 6.

12. A map of a local defining area produced by the method of claim 7.

13. A map of a local defining area produced by the method of claim 9.

\* \* \* \* \*